United States Patent
Petras et al.

(10) Patent No.: US 10,445,445 B2
(45) Date of Patent: Oct. 15, 2019

(54) SLIDING TIME WINDOW CONTROL MECHANISM FOR PARALLEL EXECUTION OF MULTIPLE PROCESSOR CORE MODELS IN A VIRTUAL PLATFORM SIMULATION

(71) Applicant: Synopsys, Inc., Mountain View, CA (US)

(72) Inventors: Dietmar Petras, Würselen (DE); Thomas M. Philipp, Meerbusch (DE); Stephan Tobies, Erkelenz (DE); Kristof A. Niederholtmeyer, Aachen (DE); Koen M. C. Velle, Roeselare (BE)

(73) Assignee: Synopsys, Inc., Mountain View, CA (US)

( * ) Notice: Subject to any disclaimer, the term of this patent is extended or adjusted under 35 U.S.C. 154(b) by 291 days.

(21) Appl. No.: 15/490,451

(22) Filed: Apr. 18, 2017

(65) Prior Publication Data

US 2017/0308629 A1    Oct. 26, 2017

Related U.S. Application Data

(60) Provisional application No. 62/326,185, filed on Apr. 22, 2016.

(51) Int. Cl.
  *G06F 17/50*   (2006.01)
  *G06F 9/455*   (2018.01)
  (Continued)

(52) U.S. Cl.
  CPC ...... *G06F 17/5009* (2013.01); *G06F 9/45508* (2013.01); *G06F 9/467* (2013.01);
  (Continued)

(58) Field of Classification Search
  CPC .... G06F 9/45508; G06F 9/467; G06F 9/4881; G06F 9/52; G06F 9/4498; G06F 17/5009
  (Continued)

(56) References Cited

U.S. PATENT DOCUMENTS 7,496,490 B2 *   2/2009   Tatsuoka ............... G06F 9/52
                                              703/14
7,716,031 B2     5/2010   Vanspauwen et al.
(Continued)

FOREIGN PATENT DOCUMENTS

CN   101788919 A  *  7/2010
CN   102591759 A  *  7/2012

OTHER PUBLICATIONS

Murillo et al., Synchronization for Hybrid MPSoC Full-System Simulation, Proceedings of the 49th Design Automation Conference, Jun. 3-7, 2012, pp. 121-126 (Year: 2012).*
(Continued)

*Primary Examiner* — Kamini S Shah
*Assistant Examiner* — John E Johansen
(74) *Attorney, Agent, or Firm* — Fenwick & West LLP

(57) ABSTRACT

Embodiments of the present disclosure support a simulation of a plurality of processor core models. The processor core models are executed in parallel within a sliding time window of a defined size. Each processor core model is executed in a different corresponding thread and advances a local core time within the sliding time window. The sliding time window advances by updating a start time of the sliding time window based on the local core time of each processor core model. One or more hardware models and a simulation kernel are executed in a separate thread having a simulation time and simulation events. The start time of the sliding time
(Continued)

window is updated based further on an event time of a next event of the simulation events scheduled in the separate thread.

18 Claims, 11 Drawing Sheets

(51) Int. Cl.
- *G06F 9/46* (2006.01)
- *G06F 9/48* (2006.01)
- *G06F 9/52* (2006.01)
- *G06F 9/448* (2018.01)

(52) U.S. Cl.
CPC .............. *G06F 9/4881* (2013.01); *G06F 9/52* (2013.01); *G06F 9/4498* (2018.02)

(58) Field of Classification Search
USPC .......................................................... 703/21
See application file for complete search history.

(56) References Cited

U.S. PATENT DOCUMENTS

| | | | |
|---|---|---|---|
| 7,742,905 | B2 | 6/2010 | Vanspauwen et al. |
| 7,873,507 | B2 | 1/2011 | Tatsuoka et al. |
| 8,484,006 | B2 | 7/2013 | Vanspauwen et al. |
| 8,543,369 | B2 * | 9/2013 | Dorfel ................. G06F 11/3457 703/21 |
| 8,793,115 | B2 | 7/2014 | Vanspauwen et al. |
| 8,903,703 | B2 | 12/2014 | Vanspauwen et al. |
| 9,075,666 | B2 | 7/2015 | Janssen et al. |
| 9,201,708 | B2 | 12/2015 | Janssen et al. |
| 9,612,863 | B2 * | 4/2017 | Ventroux .............. G06F 9/4881 |
| 9,753,754 | B2 * | 9/2017 | Howell ............... G06F 11/1484 |
| 10,176,276 | B2 * | 1/2019 | Chao ................... G06F 17/5009 |
| 2013/0297282 | A1 | 11/2013 | Vanspauwen et al. |

OTHER PUBLICATIONS

Khaligh et al. Efficient Parallel Level Simulation by Exploiting Temporal Decoupling; Analysis, Architectures and Modeling of Embedded Systems, IESS 2009, pp. 149-158 (Year: 2009).*
Weinstock et al. Parallel System C Simulation for ESL Design using Flexible Time Decoupling, 3rd Workshop on Virtual Prototyping of Parallel and Embedded Systems (ViPES 2015), pp. 378-383 (Year: 2015).*
Roth et al. HLA-based Simulation Environment for distributed SystemC Simulation, Simutools 2011 Conference, Mar. 21-25, pp. 108-114 (Year: 2011).*
Jafer et al., Synchronization methods in parallel and distributed discrete-event simulation, Published in Simulation Modelling Theory, vol. 30, 2013, pp. 54-73 (Year: 2013).*
Jefferson, D. R. "Virtual Time," ACM Transactions on Programming Languages and Systems (TOPLAS), ACM, Jul. 3, 1985, pp. 404-425, vol. 7, No. 3.
Wilsey, P. A. et al., "SAVANT/TyVIS/WARPED: Components for the Analysis and Simulation of VHDL," International Verilog HDL Conference and VHDL International Users Forum (IVC/VIUF), Mar. 16-19, 1998, pp. 195-201.
Jones, S. M. et al., "Optimistic Parallelisation of SystemC," Master's thesis, Universit Joseph Fourier—Grenoble, 2011, 57 pages.
Combes, P. E. et al., "Relaxing Synchronization in a Parallel SystemC Kernel," International Symposium on Parallel and Distributed Processing with Applications, IEEE, Dec. 10-12, 2008, pp. 180-187.
Khaligh, R. S. et al., "Modeling Constructs and Kernel for Parallel Simulation of Accuracy Adaptive TLMs," in Design Automation and Test in Europe Conference and Exhibition (DATE), EDAA, 2010, pp. 1183-1188.
Weinstock, J. H. et al., "Time-Decoupled Parallel SystemC Simulation," 2014 Design, Automation and Test in Europe Conference and Exhibition (DATE), IEEE, 2014, pp. 973-976.
Khaligh, S. R. et al., "Efficient Parallel Transaction Level Simulation by Exploiting Temporal Decoupling," Analysis, Architectures and Modelling of Embedded Systems: Third IFIP TC 10 International Embedded Systems Symposium. IESS 2009, Langenargen, Germany, A. Rettberg et al. (Eds.), Sep. 14-16, 2009, pp. 149-158.
Moy, M., "Parallel Programming with SystemC for Loosely Timed Models: A Non-Intrusive Approach," 2013 Design, Automation and Test in Europe Conference and Exhibitions (DATE), IEEE, Mar. 18-22, 2013, pp. 9-14.
Schumacher, C. et al., "parSC: Synchronous Parallel SystemC Simulation on Multi-Core Host Architectures." International Conference on Hardware/Software Codesign and System Synthesis (CODES+ISSS'10), ACM, Oct. 24-29, 2010, pp. 241-246.
Sinha, R. A. et al., "Parallel Simulation of Mixed-Abstraction SystemC Models on GPUs and Multicore CPUs," 17th Asia and South Pacific Design Automation Conference (ASP-DAC), IEEE, 2012, pp. 455-460.
Chopard, B. et al., "A Conservative Approach to SystemC Parallelization, " Computational Science ICCS 2006, Lecture Notes in Computer Science, V.N. Alexandrov et al. (Eds.), 2006,pp. 653-660, vol. 3994.
Ventroux, N. J. et al., "Highly-Parallel Special-Purpose Multicore Architecture for SystemC/TLM Simulations," 2014 International Conference on Embedded Computer Systems: Architectures, Modeling and Simulation (SAMOS XIV), IEEE, 2014, pp. 250-257.

* cited by examiner

SLIDING TIME WINDOW CONTROL MECHANISM FOR PARALLEL EXECUTION OF MULTIPLE PROCESSOR CORE MODELS IN A VIRTUAL PLATFORM SIMULATION

CROSS-REFERENCE TO RELATED APPLICATIONS

This application claims benefit of U.S. Provisional Patent Application Ser. No. 62/326,185, filed Apr. 22, 2016, which is hereby incorporated by reference in its entirety.

BACKGROUND

An embodiment of the present disclosure generally relates to virtual platform simulations, and specifically relates to sliding time window control mechanism for parallel execution of multiple processor core models in a virtual platform simulation.

Most virtual platform simulations, such as SystemC based simulations, are inherently sequential in nature. Many hardware platforms are somewhat parallel or becoming increasingly parallel, which reduces simulation performance using SystemC. This is particularly true for symmetric multiprocessing (SMP) platforms; i.e., platforms in which a number of tightly coupled processor cores execute concurrently. SystemC based simulations of SMP platforms cannot easily be parallelized. Many hardware models are not configured as thread-safe or re-entrant because, in an inherent sequential SystemC simulation, thread-safety is not required and would have a negative impact on simulation performance. A hardware model is a thread-safe model if operations of the hardware model are executed in an operating system (OS) thread simultaneously with execution of operations of other instances of the same or different hardware models in other OS threads without unintended interactions between the concurrent threads.

Operations that manipulate a state that is local to a thread will usually be thread-safe, whereas operations that make concurrent updates to state that is shared between threads will usually not be thread-safe. Making such operations thread-safe will usually require the use of OS synchronization mechanism to achieve mutually exclusive access to the shared state, or the use of so-called atomic operations that the hardware provides for the thread-safe manipulation of shared state. A hardware model is a re-entrant model if an OS thread executing operations of the hardware model can be interrupted, and then be called again ("re-entered") to correctly resume the execution of remaining operations. Many legacy hardware models cannot easily be modified to be configured as thread safe or re-entrant. Parallelizing of a SystemC kernel also requires significant engineering effort, because the kernel has been implemented and optimized strictly for the sequential use case.

Conventional processor core models use temporal decoupling to increase simulation performance. A processor core model within a virtual platform simulation can be allowed to execute operations ahead of a global simulation time for a limited period of time. If a processor core model is to interact with one or more elements (hardware models) in a rest of the virtual platform simulation outside of the processor core model, the processor core model can synchronize to allow the rest of the virtual platform simulation to catch up with the execution of the processor core model. Two processor core models that utilize this form of temporal decoupling are conventionally executed in sequence.

Various conventional mechanisms can be applied to set a maximum quantum of time for which a processor core model is allowed to execute operations ahead of a rest of a virtual platform simulation outside of the processor core model. For example, the SystemC/Transaction Level Modeling 2.0 (TLM2.0) standard describes a temporal decoupling mechanism with a static quantum of time. In an implementation of a SystemC reference simulator, quanta start at equidistant time steps of a global simulation time. Each quantum of time allows a processor core model to execute operations ahead of the rest of the virtual platform simulation for a fixed number of clock cycles.

In another conventional mechanism, a size of a quantum is calculated dynamically in a manner to interrupt an execution of a processor core model at time instances where changes in a global simulation state are expected, wherein the changes in the global simulation state should be observed by the processor core model as soon as the changes occur. This implementation takes a current status of the SystemC scheduler into account. Specifically, simulation events that are already scheduled with the SystemC kernel can be used to obtain an upper bound for a next quantum of the processor core model. This ensures that the processor core model does not run past that event, which, for example, can be an interrupt request to which the processor core model should be able to react quickly.

SUMMARY

In one embodiment, disclosed is a method for simulation of a virtual prototype system that includes a plurality of processor core models. The processor core models are executed in parallel within a sliding time window of a defined size. Each processor core model is executed in a different corresponding operating system (OS) thread and advances a local core time within the sliding time window. The sliding time window advances by updating a start time of the sliding time window based at least in part on the local core time of each processor core model. One or more hardware models and a simulation kernel of the virtual prototype system outside of the plurality of processor core models, are executed in a rest of the simulation (ROTS) OS thread separate from OS threads for parallel execution of the plurality of processor core models. The ROTS OS thread is associated with a global simulation time of the virtual prototype system and with a plurality of simulation events. The start time of the sliding time window can be updated based further on an event time of a next event of the simulation events that are scheduled for processing within the ROTS OS thread.

In one embodiment, each processor core model running in parallel can be configured to switch, at a current local core time, execution of functionality of the processor core model from the corresponding OS thread to the ROTS OS thread. The simulation kernel can be configured to schedule the execution of functionality of the processor core model within the ROTS OS thread for the simulation time of the ROTS OS thread equal to the current local core time. After a certain time period of the simulation time, when specific one or more events of the processor core model are processed, the processor core model can switch execution of functionality of the processor core model from the ROTS OS thread back to the corresponding OS thread. Before the switching, the local core time of the processor core model is set to the current simulation time of the ROTS OS thread.

Disclosed embodiments further include a non-transitory computer-readable medium comprising computer-executable instructions. The computer-executable instructions, when executed by one or more processors, cause the one or more processors to execute a plurality of processor core models in parallel within a sliding time window of a defined size, each processor core model being executed in a different corresponding OS thread and advancing a local core time within the sliding time window. The instructions further cause the one or more processors to advance the sliding time window by updating a start time of the sliding time window based on the local core time of each processor core model. The instructions further cause the one or more processors to execute one or more hardware models and a simulation kernel in a separate ROTS OS thread, the ROTS OS thread having a simulation time and a plurality of simulation events, wherein the start time of the sliding time window is updated based further on an event time of a next event of the simulation events that are scheduled for processing in the ROTS OS thread.

Figure 1:
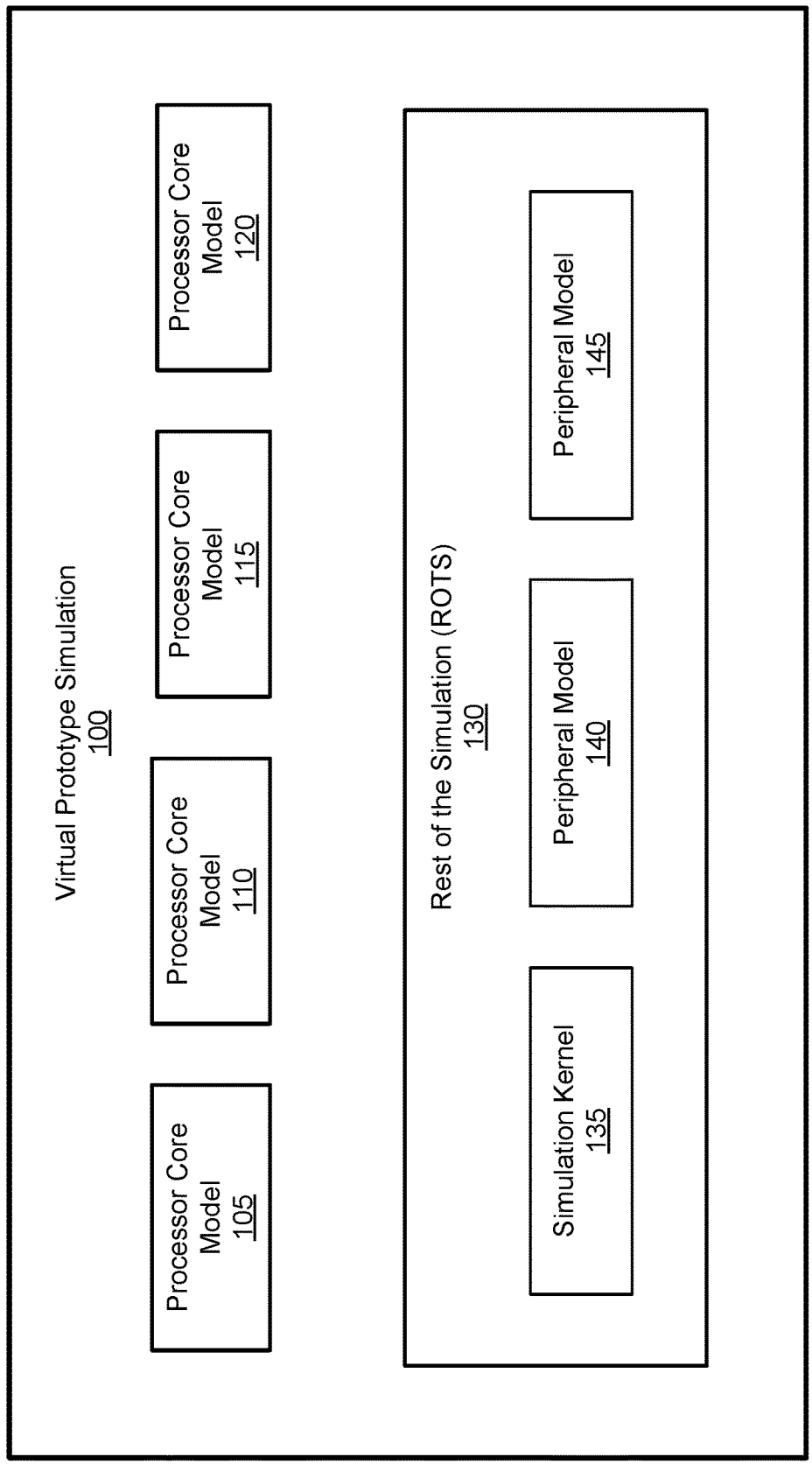
FIG. 1 is a block diagram of a virtual prototype simulation with a plurality of processor core models and a rest of the simulation (ROTS) outside of the processor core models, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Fast advancements in integrated circuit technology pose a challenge for hardware and system designers. Additionally, processors and programmable logic in general are becoming powerful and cheap enough to replace expensive application-specific integrated circuitry (ASIC). This increases the flexibility of systems at the cost of shifting functionality to the software domain. The demand for software, both in the embedded domain and for user applications, is starting to exceed the software development productivity. This adds to the productivity gap in hardware development and offers potential for improved design processes.

The reasons for low software development productivity are manifold. For software that is closely intertwined with the underlying hardware, some specific productivity limiting constraints can be observed. The development or adoption of software that directly interacts with system specific hardware blocks can often only begin after a first working prototype of the hardware design is available. Typically, this is late in the development cycle. Additionally, the debugging process for software that runs on a system level prior to any operating system being booted, is tedious and time consuming, due to limited hardware debugging capabilities.

By developing an abstract model of the entire system, early on in the development, analysis and verification of the system behavior can be allowed before any hardware component is complete. The introduction of the abstract model also provides ways to start software development earlier and to improve the abilities to debug system level software. The development of hardware and software can be parallelized to shorten the development time as a whole. Virtual prototyping of system-on-chips (SoCs) can start long before a first physical prototype exists.

System level simulations and the development of virtual prototypes have become an integral part of the design flow of modern SoCs. A system level simulation loosens the dependency of software development on the availability of a first hardware prototype and improves the debug capabilities for embedded software. The choice of the level of abstraction that is applied to the virtual prototype depends on the application. More detailed simulations usually result in slower simulations, while higher abstraction levels result in less accurate timing of simulation events and simulated operations associated with the events. The parallelization approach proposed herein focuses on loosely timed models of hardware blocks that have high performance demands, while the timing accuracy is of less importance.

As the complexity of system-on-chip (SoC) designs grows, virtual prototypes become larger and more difficult to simulate. Technological advancement to multi-processor systems on chip (MPSoC) in particular has spawned new challenges regarding the simulation performance. The simulation technologies used to develop and run virtual prototypes vary from custom C++ models to graphical design tools. A well-established example is SystemC, which specifies a C++ class library and simulation kernel for the development of virtual prototypes. SystemC specifies a C++ class library that introduces a notion of time and provides means to describe concurrency as well as data types typically used to describe hardware. SystemC explicitly does not restrict the use of C++ which makes it very flexible and easily integrable with other technologies. At its core, SystemC is a discrete event simulator. An event scheduler determines a next event to be handled based on a priority factor. In an embodiment, an event with the closest future time has the highest priority. The functionality associated with the selected event gets executed and can generate new events. The selection and execution of events repeats in a loop, and the simulation terminates if no events are left or if the functionality associated with events requests termination of the simulation. In discrete event simulations presented herein, an event represents a helper object to execute a certain set of operations or functionality at a future time. When a simulation time reaches a time of a certain scheduled event, the operations/functionality associated with the event is executed.

Disclosed embodiments include a method for a virtual prototype simulation. In some embodiments, the virtual prototype simulation is a SystemC simulation. The virtual prototype simulation disclosed herein includes a plurality of processor core models. A processor core model can be a representation of a real physical processor core in a multi-core computer system. In accordance with embodiments of the present disclosure, the processor core models can be executed in parallel within a sliding time window. Each processor core model is executed in a different operating system (OS) thread that advances a local core time of the processor core model until an end time of the sliding time window. The sliding time window advances based at least in part on the local core time of each processor core model, as discussed in more detail below. In some embodiments, any other hardware model(s), e.g., a model of a direct memory access (DMA) controller, can be executed in parallel with at least one processor core model or some other hardware model within the sliding time window. Each hardware model is executed in a different OS thread that advances a local time of the hardware model until the end time of the sliding time window. The sliding time window advances based at least in part on the local time of each hardware model.

The virtual prototype simulation disclosed herein further includes one or more representations of hardware blocks outside the processor core models executed in parallel within parallel OS threads, i.e., a rest of the simulation (ROTS). The ROTS includes one or more hardware models and a simulation kernel. The one or more hardware models can include one or more peripheral models and/or one or more processor core models that are not thread-safe, i.e., one or more processor core models that are not executed within the parallel OS threads. In some embodiments, the simulation kernel is configured as a simulation scheduler that schedules processing of simulation events and execution of operations associated with the events. In one or more embodiments, the simulation kernel is implemented to operate as SystemC kernel. Operations of the ROTS scheduled by the simulation kernel can be executed in a separate ROTS OS thread independent of OS threads in which the processor core models are executed in parallel.

A simulation time of the separate ROTS OS thread represents a global simulation time of the virtual prototype simulation. In contrast, a local core time of each processor core model running in parallel in a dedicated OS thread represents a time that is tracked only within the dedicated OS thread during execution of functionality of that processor core model. A local core time of each processor core model running in parallel can freely advance within boundaries of the sliding time window. The dedicated OS thread prevents, in general, the local core time to advance past an end time of the sliding time window. The sliding time window advances by updating a start time of the sliding time window based on a local core time of each processor core model running in parallel and an event time of a next event scheduled for processing by the ROTS in a time instant of the simulation time. The global simulation time advances independently of a local core time of each processor core model running in parallel. The simulation time lags behind a local core time of each processor core model running in parallel. The simulation time can reach at most the start time of the sliding time window. Details about advancing a local core time of each processor core model running in parallel, advancing the sliding time window, and advancing the simulation time are disclosed in conjunction with FIGS. 3-8.

The method for the virtual prototype simulation disclosed herein allows multiple processor core models to be simulated concurrently. The virtual prototype simulation is configured in the present disclosure to enable concurrent simulations for a large number of processor core models. The method for the virtual prototype simulation provides synchronization between local core times of the processor core models running in parallel and the global simulation time of the virtual prototype simulation. A control mechanism is presented herein that allows a processor core model to switch execution of operations of the processor core model between an OS thread dedicated to the processor core model running in parallel with other processor core models and a separate ROTS OS thread that executes operations of ROTS scheduled by a simulation kernel.

FIG. 1 is a block diagram of a virtual prototype simulation 100 with a plurality of processor core models and ROTS having representations of hardware blocks outside the processor core models, in accordance with an embodiment. The virtual prototype simulation 100 includes a plurality of thread-safe processor core models, e.g., processor core models 105, 110, 115, 120. A processor core model is a thread-safe model and interacts in a thread-safe manner with other hardware models if operations of the processor core model are executed in an OS thread simultaneously with execution of operations of other processor core models or ROTS in other OS threads without unintended interactions between the concurrent threads. Each processor core model can include an instruction set simulator. The virtual prototype simulation 100 further includes ROTS 130 with simulation representations of hardware blocks outside the processor core models 105, 110, 115, 120, e.g., a simulation kernel 135 and peripheral models 140, 145. The virtual prototype simulation 100 may be executed on a multi-core host computer system that supports simultaneous execution of multiple OS threads, e.g., on a computer system 900 shown in FIG. 9. In some embodiments, the simulation kernel 135 is not configured as a thread-safe simulation kernel, but contains some localized adaptations to support the sliding time window mechanism and the associated transitions of the processor core models 105, 110, 115, 120 between their parallel OS threads and the ROTS OS thread.

The processor core models 105, 110, 115, 120 in FIG. 1 are configured to distinguish between internal and external operations. External operations represent any interaction of a processor core model 105, 110, 115, 120 with the ROTS 130, e.g., reading and writing to memory and peripherals through transactions, handling of interrupt and reset lines, or waiting for a simulation time of the virtual prototype simulation 100 to reach a certain value. All other operations are considered internal operations, e.g., a direct access to a memory via a direct memory interface (DMI) mechanism.

Figure 2:
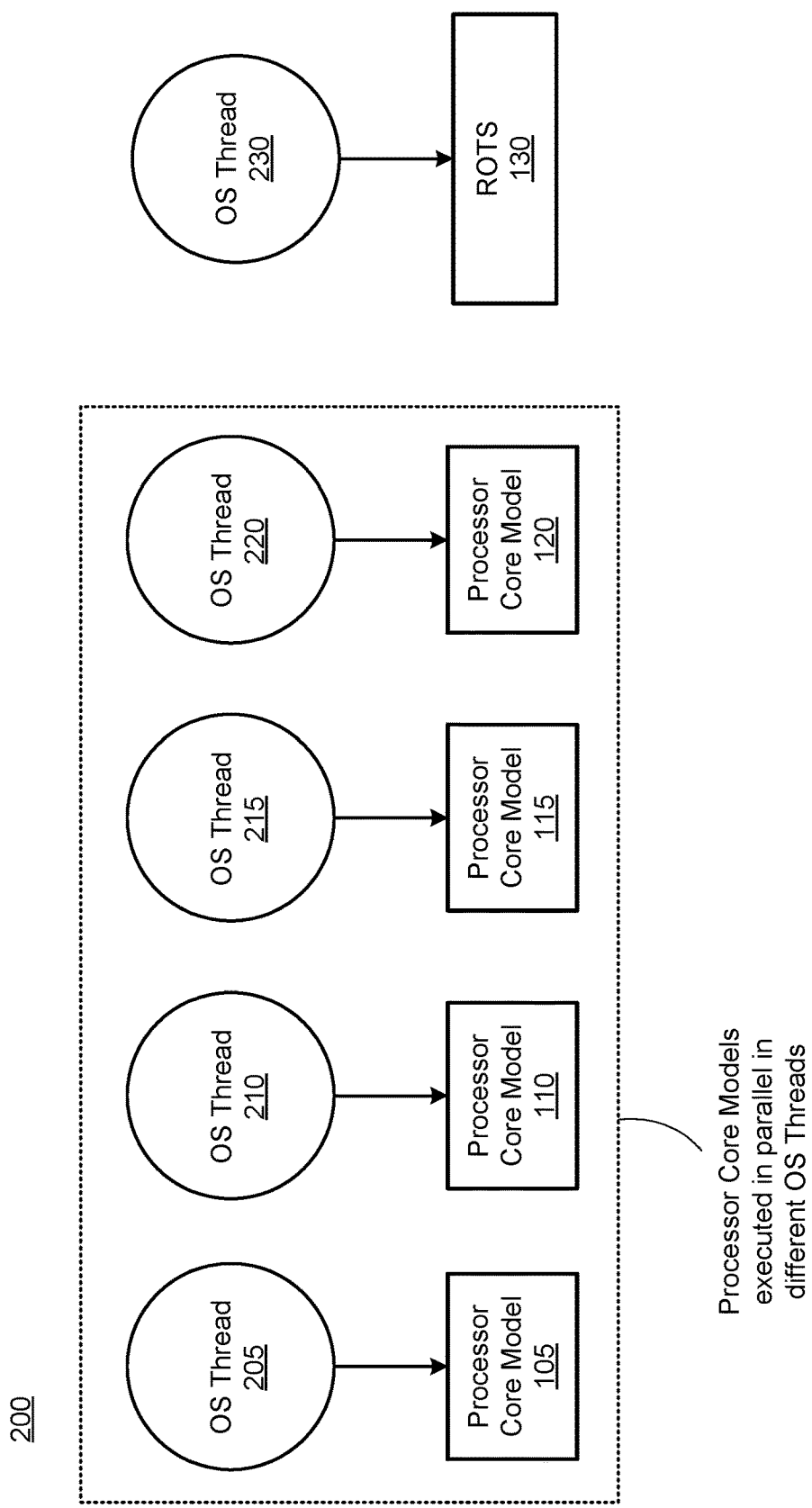
FIG. 2 illustrates an example allocation of a different operating system (OS) thread dedicated for execution of each processor core model and allocation of a ROTS OS thread for execution of operations of the ROTS in the virtual prototype simulation in FIG. 1, in accordance with an embodiment.

FIG. 2 illustrates an example allocation 200 of a different OS thread dedicated for execution of each processor core model 105, 110, 115, 120 and allocation of a separate ROTS OS thread for execution of operations of the ROTS 130 in the virtual prototype simulation 100 in FIG. 1, in accordance with an embodiment. Each processor core model 105, 110, 115, 120 is executed in a different OS thread specifically dedicated to that processor core model. As shown in FIG. 2, the processor core model 105 is executed in a dedicated OS thread 205, the processor core model 110 is executed in a dedicated OS thread 210, the processor core model 115 is executed in a dedicated OS thread 215, and the processor core model 120 is executed in a dedicated OS thread 220. Given sufficient hardware resources on a simulation host running the virtual prototype simulation 100, the processor core models 105, 110, 115 and 120 can be executed concurrently in different OS threads 205, 210, 215, 220. As further shown in FIG. 2, an OS thread 230 separate from the OS threads 205, 210, 215, 220 dedicated for concurrent execution of the processor core models 105, 110, 115, 120 is used for execution of operations of the ROTS 130. A processor core model 105, 110, 115, 120 is an example of a hardware model, and in other embodiments non-processor hardware models may be executed in the OS threads 205, 210, 215, 220 instead of the processor core models 105, 110, 115, 120.

Internal operations of each processor core model 105, 110, 115, 120 are thread-safe operations and are executed on the dedicated OS thread 205, 210, 215, 220. The processor core model 105, 110, 115, 120 can run concurrently on a multi-core host computer. In an embodiment, multiple instances of each processor core model 105, 110, 115, 120 are configured to execute concurrently in different OS threads. The ROTS 130 may be configured to interact in a thread-safe manner with each processor core model 105, 110, 115, 120. For example, the ROTS 130 may be able to signal an interrupt request (IRQ) to any of the processor core models 105, 110, 115, 120 while that processor core model may be running in parallel with at least one other processor core model, or while that processor core model is running in parallel with the ROTS 130. Operations that are external to the processor core models 105, 110, 115, 120, as well as the simulation of the ROTS 130 can be dispatched to the simulation kernel 135. The simulation kernel 135 is configured to execute operations in the OS thread 230 specifically dedicated to the simulation kernel 135. Thus, in general, in a virtual prototype simulation with k processor core models, there are at least k+1 OS threads, i.e., k OS threads for parallel execution of operations of k processor core models and one separate ROTS OS thread for execution of operations of ROTS outside the processor core models. In some embodiments, the virtual prototype simulation can include additional OS threads used for other purposes that are outside the mechanisms and scope of the present disclosure.

Figure 3:
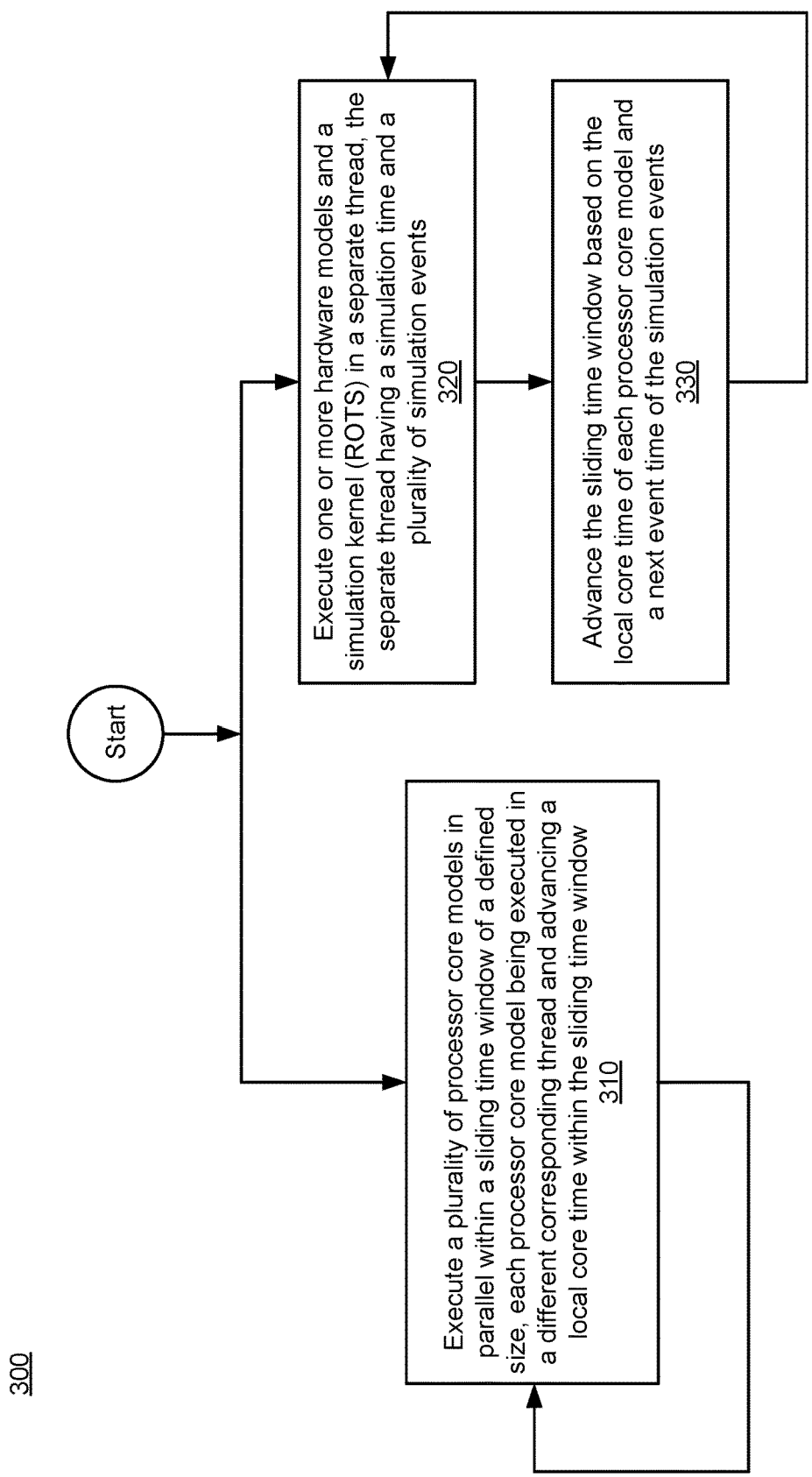
FIG. 3 is a flow chart illustrating a process of a method for parallel execution of a plurality of processor core models based on a sliding time window, in accordance with an embodiment.

FIG. 3 is a flow chart 300 illustrating a process of a method for parallel execution of a plurality of processor core models based on a sliding time window, in accordance with an embodiment. The process 300 of FIG. 3 may be performed by the components of a virtual prototype simulation, such as the virtual prototype simulation 100 in FIG. 1. Other entities may perform some or all of the steps of the process in other embodiments. Likewise, embodiments may include different and/or additional steps, or perform the steps in different orders.

The virtual prototype simulation executes 310 a plurality of processor core models in parallel within a sliding time window of a defined size, each processor core model being executed in a different thread and advancing a local core time within the sliding time window. Each processor core model is prevented from advancing the local core time past an end of the sliding time window. If it is determined that the local core time has reached the end of the sliding time window, the processor core model generally waits until the sliding time window is advanced before the processor core model simulates additional instructions and advances its local core time. In some embodiments, the processor core model is allowed to simulate certain set of instructions even though the local core time has reached the end of the sliding time window. Details about parallel execution of processor core models within a sliding time window are disclosed in conjunction with FIG. 4, FIGS. 5A-5D and FIG. 8.

The virtual prototype simulation executes 320 one or more hardware models and a simulation kernel in a separate ROTS thread, the separate ROTS thread having a simulation time and a plurality of simulation events. It should be understood that the virtual prototype simulation executes 320 the one or more hardware models and the simulation kernel in the separate ROTS thread concurrently with execution 310 of the plurality of processor core models. The one or more hardware models and the simulation kernel represent components outside of the processor core mode. For example, the one or more hardware models and the simulation kernel are part of ROTS. Details about execution of the one or more hardware models and the simulation kernel in the separate thread, as well as interaction with a processor core model running in parallel are disclosed in conjunction with FIGS. 6A-6B, and FIGS. 7-8.

The virtual prototype simulation advances 330 the sliding time window based on the local core time of each processor core model. The virtual prototype simulation advances 330 the sliding time window by updating a start time of the sliding time window based on the local core time of each processor core model. The start time of the sliding time window can be updated based further on an event time of a next event of the simulation events that are scheduled for processing in the separate ROTS thread. The virtual prototype simulation advances 330 the sliding time window relative to the simulation time of the separate thread in which the simulation kernel executes operations. In some embodiments, the virtual prototype simulation advances 330 the sliding time window in the separate ROTS thread concurrently with execution 310 of the processor core models. In alternative embodiments (not shown in FIG. 3), the virtual prototype simulation advances 330 the sliding time window in another thread, which can be executed concurrently with execution 310 of the processor core models and execution 320 of the one or more hardware models and the simulation kernel in the separate thread. Once the sliding time window advances 330, the virtual prototype simulation executes 310 the plurality of core models in parallel within the advanced sliding time window, and the virtual prototype simulation executes 320 the one or more hardware models and the simulation kernel in the separate thread. Details about advancing the sliding time window are disclosed in conjunction with FIG. 4, FIGS. 5A-5D and FIG. 7.

Initial results have shown that executing processor core models in different OS threads, executing the ROTS in another thread, and then using a sliding time window to restrict the advancement of the virtual prototype simulation can result in a 2× to 8× improvement in simulation speed. Embodiments of the present disclosure thus address the technical problem of increasing efficiency of the virtual prototype simulation.

Figure 4:
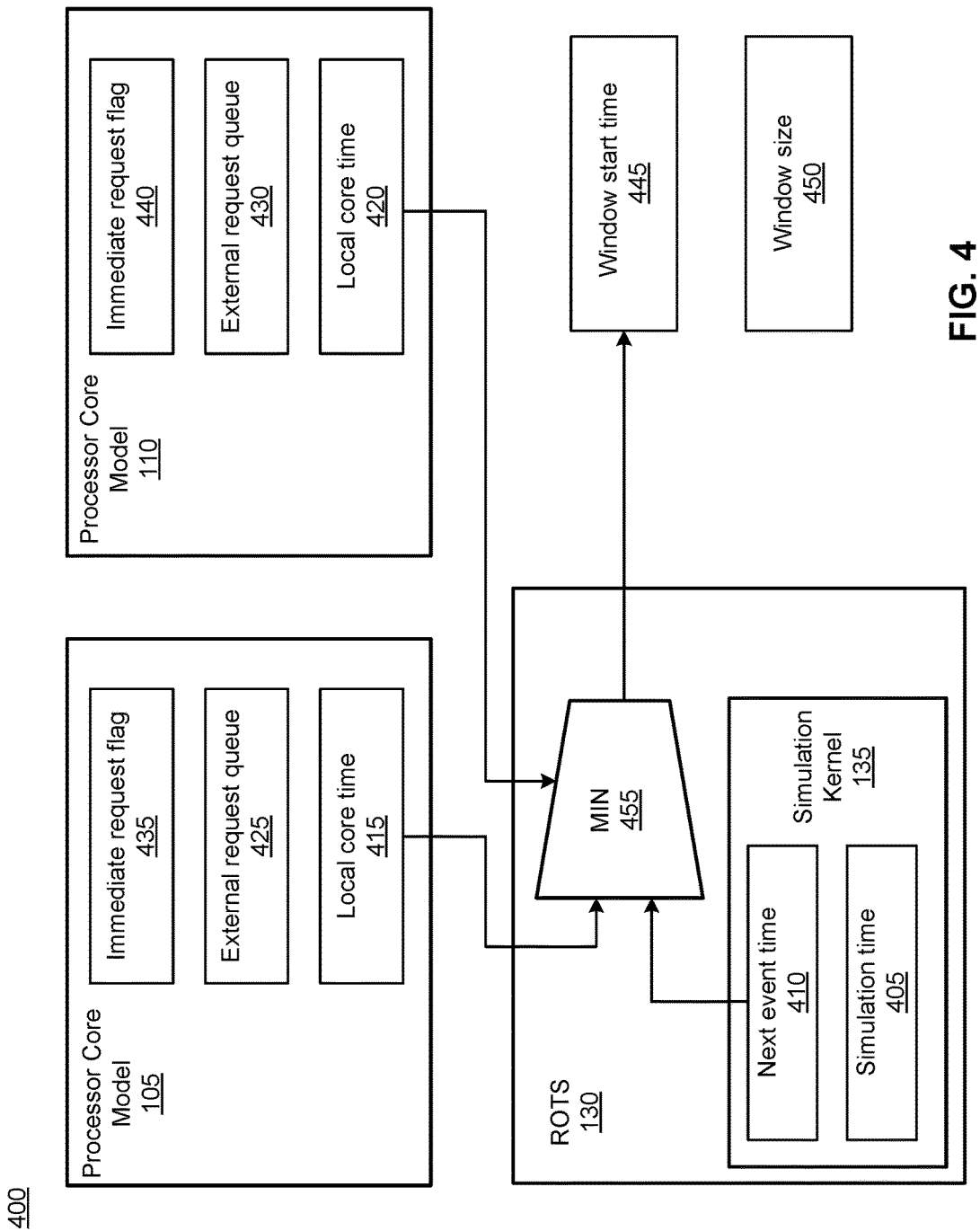
FIG. 4 illustrates a control mechanism for advancing a sliding time window and synchronization of execution of the plurality of processor core models and the ROTS in the virtual prototype simulation in FIG. 1, in accordance with an embodiment.

FIG. 4 illustrates a control mechanism 400 for advancing a sliding time window and synchronization of an execution of any of the processor core models 105, 110, 115, 120 and an execution of the ROTS 130 in the virtual prototype simulation 100 in FIG. 1, in accordance with an embodiment. In the illustrative embodiment shown in FIG. 4, the processor core models 105 and 110 are executed in parallel. However, the control mechanism 400 can be applied to any number of processor core models executed concurrently.

Execution of operations in the ROTS 130 is controlled by the simulation kernel 135 that represents a simulation scheduler. The simulation kernel 135 includes certain control variables, including a simulation time 405 and a next event time 410. The simulation time 405 defines a global simulation time at which the ROTS 130 is executed, e.g., within the ROTS OS thread 230.

The simulation kernel 135 includes a queue of simulation events (not shown in FIG. 4). The simulation events in the queue represent activities of the ROTS 130 that are scheduled for a future simulation time. For example, a timer model can be configured to tick at a certain future time. In this case, the timer model schedules an event for the time of ticking. When the global simulation time reaches the time of this event, one or more operations associated with the event are executed, which will cause the timer model to execute its runout operation and raise an IRQ interrupt signal.

The next event time 410 represents the earliest time instant for which at least one event in the queue is scheduled for processing. For example, the next event time 410 is a smallest (i.e. closest in the future) scheduled time of the at least one event within the queue of simulation events. Note that the simulation time 405 is less than or equal to the next event time 410 at any point of simulation because it is illegal to schedule one or more events for the past. In some embodiments, the simulation time 405 is equal to the next event time 410 whenever the simulation kernel 135 processes the earliest event(s) from the queue of simulation events. In some other embodiments, the simulation time 405 is less than the next event time 410 when the simulation kernel 135 processes the earliest event(s) from the event queue. In discrete event simulations, the simulation kernel 135 is configured to, after executing all activities from a current simulation time 405, pop the next event and all further event(s) from the event queue having the same scheduled time. The simulation kernel 135 advances the current simulation time 405 to the scheduled time of the popped events and then processes all activities associated with the popped events. Thus, the next event time 410 is larger than the current simulation time 405 when the events are popped from the event queue. During execution of the activities associated with the popped events, new events may be scheduled. The newly scheduled events may become new earliest events, reducing the next event time 410, although never to a time instant previous to the current simulation time. Thus, it is possible to schedule the new events for the current simulation time 405, in which case the next event time 410 becomes equal to the current simulation time 405.

Each processor core model also contains several control variables. As shown in FIG. 4, the processor core model 105 contains a local core time 415 that represents a current local simulation time of the processor core model 105 while the processor core model 105 is executed in parallel with at least one other processor core model. Similarly, the processor core model 110 contains a local core time 420 that represents a current local simulation time of the processor core model 110 while the processor core model 110 is executed in parallel with at least one other processor core model. The local core time 415 is written by the OS thread 205 that executes functionality of the processor core model 105, and the local core time 415 is read by the ROTS OS thread 230 that executes functionality of the ROTS 130. Similarly, the local core time 420 is written by the OS thread 210 that executes functionality of the processor core model 110, and the local core time 420 is read by the ROTS OS thread 230. In one embodiment, the local core time is computed based on the number of simulated instructions of the processor core model and the associated cycle time of the processor core model.

In some embodiments, any processor core model 105, 110 in FIG. 4 executed in parallel can request transition to a sequential mode of execution. After switching execution to the sequential mode, the functionality of the processor core model is scheduled for execution by the simulation kernel 135 and executed by the ROTS OS thread 230. This may involve scheduling of events to move execution of certain parts of the functionality of the processor core models to a future simulation time. To prevent causality errors, the simulation kernel 135 is configured not to be able to handle events from the past. A processor core model lagging behind the current (global) simulation time of the ROTS OS thread 230 could not be allowed to inject an event notification into the queue of simulation events of the simulation kernel 135. To prevent this, the ROTS OS thread 230 cannot advance the simulation time past each local core time of a processor core model running in parallel. Thus, the local core time 415 and the local core time 420 are larger than or equal to the simulation time 405, i.e., the processor core models 105, 110 executed in parallel are running ahead of the ROTS 130. More details about transition of a processor core model from a parallel execution (parallel mode) to a sequential execution (sequential mode) are disclosed in conjunction with FIGS. 6A-6B.

As further shown in FIG. 4, the processor sore model 105 includes an external request queue 425 and the processor core model 110 includes an external request queue 430, wherein the external request queues 425, 430 are both written by the OS thread 230 of the ROTS 130. Writing by the OS thread 230 to the external request queue 425 indicates to the processor sore model 105 running in the parallel mode that certain one or more asynchronous events happened within the ROTS 130 and need to be handled externally by the processor core model 105. Similarly, writing by the OS thread 230 to the external request queue 430 indicates to the processor core model 110 in the parallel mode that certain one or more asynchronous events happened within the ROTS 130 and need to be handled externally by the processor core model 110. More details about handling of external requests by a processor core model are disclosed in conjunction with FIG. 8.

The processor sore model 105 further includes an immediate request flag 435, and the processor core model 110 further includes an immediate request flag 440. The immediate request flags 435, 440 are both written by the OS thread 230 of the ROTS 130. Writing by the ROTS OS thread 230 to the immediate request flag 435 indicates to the processor core model 105 in the parallel mode that certain one or more synchronous events happened within the ROTS 130 and need to be immediately handled by the processor sore model 105. Similarly, writing by the ROTS OS thread 230 to the immediate request flag 440 indicates to the processor core model 110 in the parallel mode that certain one or more synchronous events happened within the ROTS 130 and need to be handled immediately by the processor core model 110. More details about handling of immediate requests by a processor core model are disclosed in conjunction with FIG. 8.

A global variable named window start time 445 represents a start time of a sliding time window within which the processor core models are executed in parallel. The window start time 445 may be written by the OS thread 230 of the ROTS 130. The window start time 445 can be read by each OS thread executing functionality of the processor core model in the parallel mode, e.g., by the OS threads 205, 210 of the processor core models 105, 110 shown in FIG. 4. A global configuration parameter named window size 450 defines a size of the sliding time window. In some embodiments, the window size 450 is set by the simulation kernel 135. In one embodiment, the parameter window size 450 has a constant value during parallel execution of the processor core models. In an alternate embodiment, the parameter window size 450 has a value that can dynamically change during the simulation time as a number of operations to be executed on each processor core model may change during the virtual prototype simulation 100.

As shown in FIG. 4, the ROTS 130 further includes a minimum function block 455 that receives inputs from the simulation kernel 135 and the processor core models 105, 110 running in parallel. Specifically, the inputs to the minimum function block 455 are the local core times 415, 420 of the processor core models 105, 110 and the next event time 410 of the simulation kernel 135. An output of the minimum function block 455 updates the window start time 445 based on the local core times 415, 420 and the next event time 410. In specific, the window start time 445 is determined to be the minimum of the local core times 415, 420 and the next event time 410. The simulation kernel 135 updates the window start time 445 when all activities resulting from events of the ROTS 130 scheduled for the current simulation time 405 are processed. By updating the window start time 445, the sliding time window for parallel execution of the processor core models advances relative to the simulation time 405. In some embodiments, the ROTS OS thread 230 executing functionality of the ROTS 130 updates a start time of the sliding time window as either a local time of a slowest processor core model running in parallel or a time instant of a next scheduled event in the simulation kernel 135. The minimum function 455 ensures that the ROTS OS thread 230 that executes functionality of the ROTS 130 scheduled by the simulation kernel 135 is prevented from running ahead of the processor core models executed in parallel, thus preventing causality errors when any of the processor core models transition from the parallel mode to the sequential mode. More details about advancing the sliding time window are disclosed in conjunction with FIGS. 5A-5D and FIG. 7.

Figure 5A:
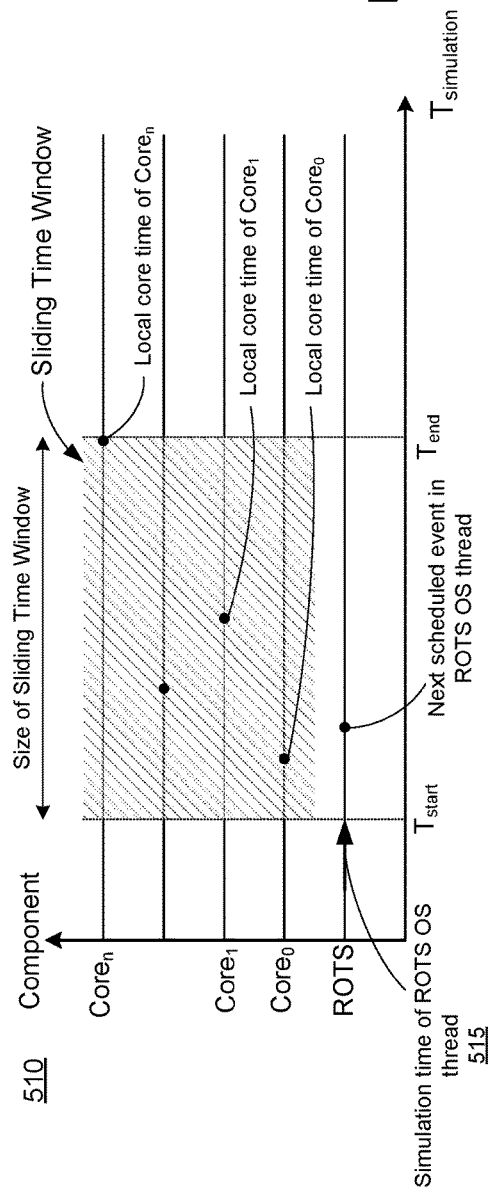
FIG. 5A illustrates an example of states of local core times for a plurality of processor core models executed in parallel within a sliding time window and a state of a next scheduled event in ROTS, in accordance with an embodiment.

FIG. 5A illustrates an example 510 of states of local core times for a plurality of processor core models executed in parallel within a sliding time window and a state of a next scheduled event in a simulation kernel of ROTS, in accordance with an embodiment. As shown in FIG. 5A, a plurality of processor core models, $Core_0$, $Core_1$, ..., $Core_n$ are executed in parallel within a sliding time window of a defined size, e.g., a constant size. As discussed above, each processor core model is executed in a different OS thread and advances a state of a local core time within the sliding time window. Each processor core model is prevented from advancing the local core time past an end time $T_{end}$ of the sliding time window. The end time $T_{end}$ of the sliding time window can be determined as a sum of a start time $T_{start}$ of the sliding time window and the defined size of the sliding time window. In the illustrative embodiment in FIG. 5A, the processor core model $Core_0$ is the slowest among all the processor core models $Core_0$, $Core_1$, ..., $Core_n$ running in parallel. The local core time of the processor core model $Core_0$ has advanced the least among local core times of the processor core models being executed in parallel within the sliding time window.

The method presented herein for synchronization between each processor core model running in parallel and the ROTS prevents causality errors. A simulation kernel of the ROTS is configured to be unable to handle events from the past. A processor core model lagging behind a current simulation time 515 of a ROTS OS thread executing functionality of the ROTS would not be allowed to inject an event notification into an event queue of the simulation kernel. To prevent injecting such event into the event queue of the simulation kernel, a simulation time 515 of the ROTS OS thread cannot be ahead of each local core time of the processor core model $Core_0$, $Core_1$, ..., $Core_n$ running in parallel. From the perspective of the simulation kernel and the ROTS OS thread, all events generated by the processor core models $Core_0$, $Core_1$, ..., $Core_n$ will appear in the present or in the future. Thus, the ROTS OS thread is configured to prevent from advancing the simulation time 515 past the start time $T_{start}$ of the sliding time window, as shown in FIG. 5A. In other words, the simulation time 515 of the ROTS OS thread can only reach the start time $T_{start}$ of the sliding time window.

The sliding time window advances by updating the start time $T_{start}$ of the sliding time window. The updated end time $T_{end}$ of the sliding time window is determined as a sum of the updated start time $T_{start}$ of the sliding time window and the defined size of the sliding time window. To prevent the causality errors described above, the start time $T_{start}$ of the sliding time window can be calculated as:

$$T_{start} = \min\{T_t, T_0, \ldots, T_n\}, \quad (1)$$

where $T_i$ is a local core time of a processor core model $Core_i$ (i=0, 1, ..., n), and $T_t$ is a time of a next event scheduled by the simulation kernel. The simulation kernel updates the start time $T_{start}$ of the sliding time window and advances the sliding time window according to equation (1) when all activities resulting from events of the ROTS scheduled for the current simulation time 515 are processed. The simulation kernel is configured to be blocked if the simulation kernel tries to advance the global simulation time past the start time $T_{start}$ of the sliding time window. While the simulation kernel is blocked from advancing the global simulation time, the sliding time window can still move forward, because the start time $T_{start}$ of the sliding time window depends, in accordance with equation (1), on a time of the next scheduled event $T_t$ and not on the actual simulation time 515 of the simulation kernel controlling the ROTS OS thread. As shown in FIG. 5A, the next scheduled event in the ROTS OS thread can be scheduled for a time instant past the start time $T_{start}$ of the sliding time window. However, the simulation time 515 of the ROTS OS thread will not advance until functionality of the ROTS associated with the next scheduled event in the ROTS OS thread is executed. The execution of the functionality of the ROTS associated with the next scheduled event will occur exactly at an updated start time of an advanced sliding time window, as discussed in more detail in conjunction with FIG. 5D.

Figure 5B:
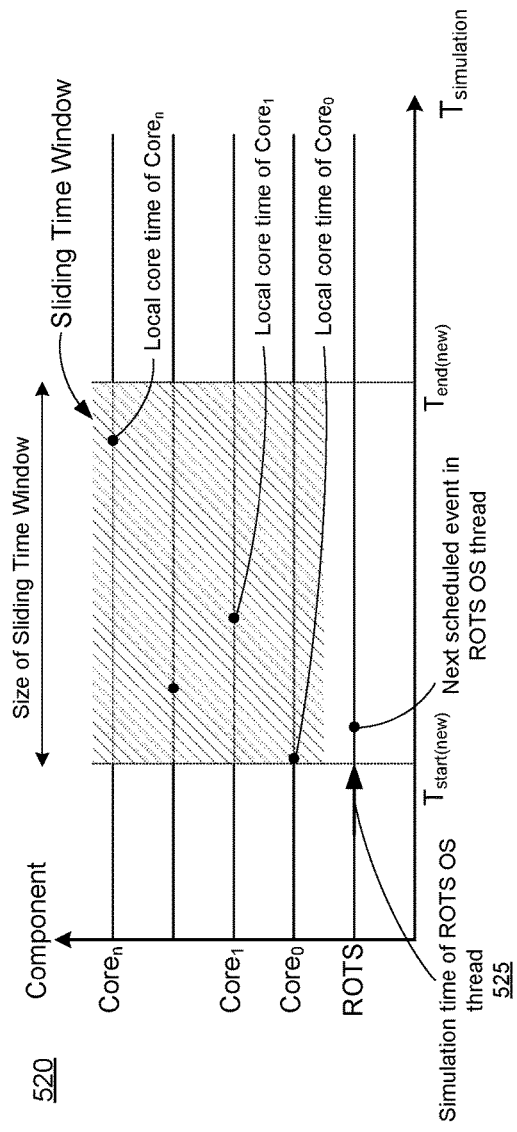
FIG. 5B illustrates an example of advancing the sliding time window shown in FIG. 5A based on local core times of the processor core models and a time of the next scheduled event, in accordance with an embodiment.

FIG. 5B illustrates an example 520 of advancing the sliding time window shown in FIG. 5A based on a local core time of a currently slowest one of the processor core models running in parallel, in accordance with an embodiment. The updated start time of the sliding time window is calculated in accordance with equation (1) and becomes equal to $T_0$, where $T_0$ is a local core time of the currently slowest processor core model $Core_0$. The updated end time of the sliding time window is equal to a sum of the updated start time of the sliding time window, $T_0$, and the defined size of the sliding time window. As shown in FIG. 5B, the sliding time window from FIG. 5A advances to the updated start time equal to the local core time of the processor core model $Core_0$. In the illustrative embodiment shown in FIGS. 5A and 5B, the defined size of the sliding time window is constant. In alternative embodiments (not shown in FIGS. 5A and 5B), the defined size of the sliding time window can dynamically change during the simulation time, e.g., as a number of operations to be executed by a processor core model during the sliding time window dynamically changes during the simulation. To prevent the causality errors discussed above, a simulation time 525 of the ROTS OS thread cannot be ahead of each local core time of the processor core model $Core_0$, $Core_1$, . . . , $Core_n$ running in parallel within the advanced sliding time window, as shown in FIG. 5B. However, as further shown in FIG. 5B, a next event in the ROTS OS thread can be scheduled for processing for a time instant past the updated start time $T_{start}$ of the advanced sliding time window.

Figure 5C:
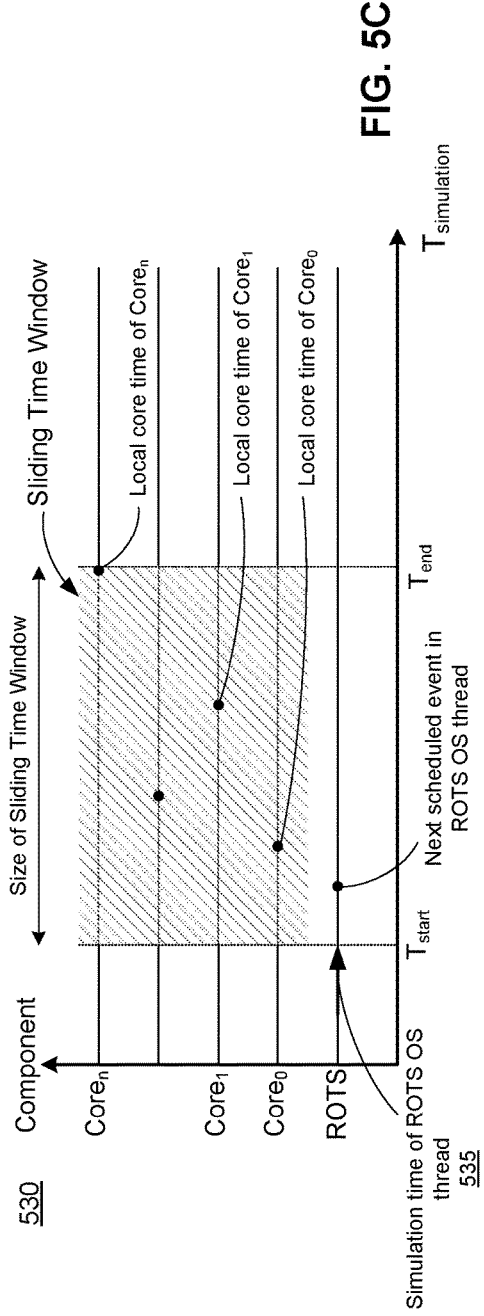
FIG. 5C illustrates another example of states of local core times for a plurality of processor core models executed in parallel within a sliding time window and a state of a next scheduled event in ROTS, in accordance with an embodiment.

FIG. 5C illustrates another example 530 of states of local core times for a plurality of processor core models executed in parallel within a sliding time window and a state of a next scheduled event in a simulation kernel of ROTS, in accordance with an embodiment. As shown in FIG. 5C, a plurality of processor core models, $Core_0$, $Core_1$, . . . , $Core_n$ are executed in parallel within a sliding time window of a defined size. As shown in FIG. 5C, a simulation time 535 of the simulation kernel that controls execution of a ROTS OS thread with events of the ROTS lags behind each local core time $T_i$ of a processor core model $Core_i$ (i=0, 1, . . . , n) running in parallel. The simulation time 535 of the ROTS OS thread can reach at most a start time $T_{start}$ of the sliding time window. In the illustrative embodiment shown in FIG. 5C, a time for execution of functionality of the ROTS associated with a next scheduled event in the simulation kernel, $T_t$, is also before each local core time $T_i$ of a processor core models $Core_i$ (i=0, 1, . . . , n) running in parallel. Thus, in accordance with equation (1), the start time $T_{start}$ of the sliding time window will be updated to be equal to a next scheduled event time in the simulation kernel, i.e., the updated start time of the sliding time window is equal to $T_t$.

Figure 5D:
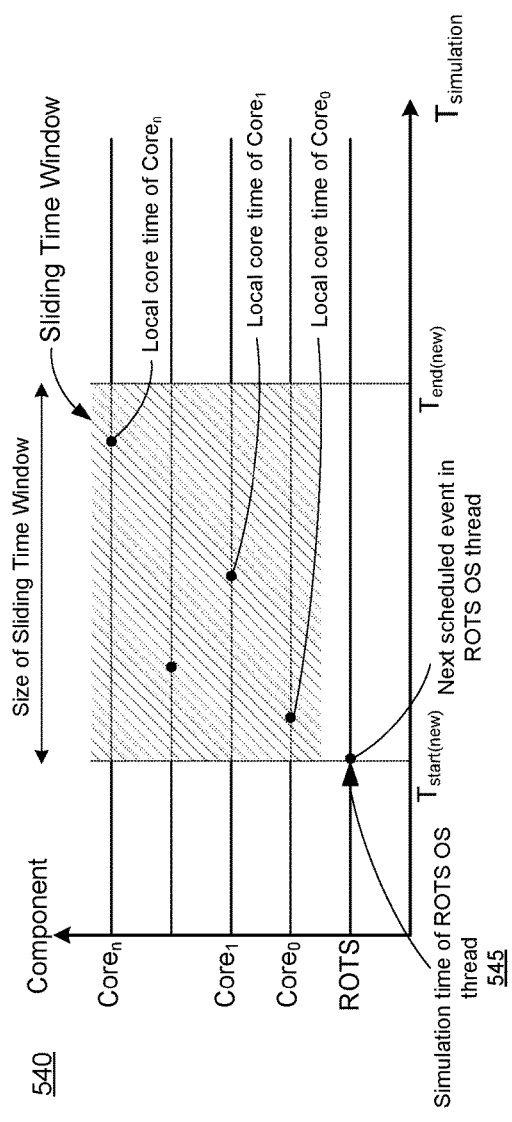
FIG. 5D illustrates an example of advancing the sliding time window shown in FIG. 5C based on local core times of the processor core models and a time of the next scheduled event, in accordance with an embodiment.

FIG. 5D illustrates an example 540 of advancing the sliding time window shown in FIG. 5C based on the next scheduled event time $T_t$ in the simulation kernel controlling the ROTS OS thread, in accordance with an embodiment. As shown in FIG. 5D, the updated start time of the sliding time window is equal to the next scheduled event time, $T_t$, in the simulation kernel. The updated end time of the sliding time window is equal to a sum of the updated start time of the sliding time window, $T_t$, and the defined size of the sliding time window. As shown in FIG. 5D, the sliding time window from FIG. 5C advances to the updated start time equal to the next scheduled event time of the simulation kernel. In the illustrative embodiment shown in FIGS. 5C and 5D, the defined size of the sliding time window is constant. In alternative embodiments (not shown in FIGS. 5C and 5D), the defined size of the sliding time window can dynamically change during the simulation time. As shown in FIG. 5D, a simulation time 545 of the ROTS OS thread is set to be equal to a time instant of the next scheduled event in the ROTS OS thread. Then, the ROTS OS thread executes functionality of the ROTS associated with the next scheduled event as the simulation time 545 has reached the time instant of the next scheduled event. To prevent the causality errors discussed above, the simulation time 545 of the ROTS OS thread cannot be ahead of each local core time of the processor core model $Core_0$, $Core_1$, . . . , $Core_n$ running in parallel within the advanced sliding time window. This is ensured by setting the updated start time of the advanced sliding time window to be equal to the time instant of the next scheduled event in the ROTS OS thread.

Figure 6A:
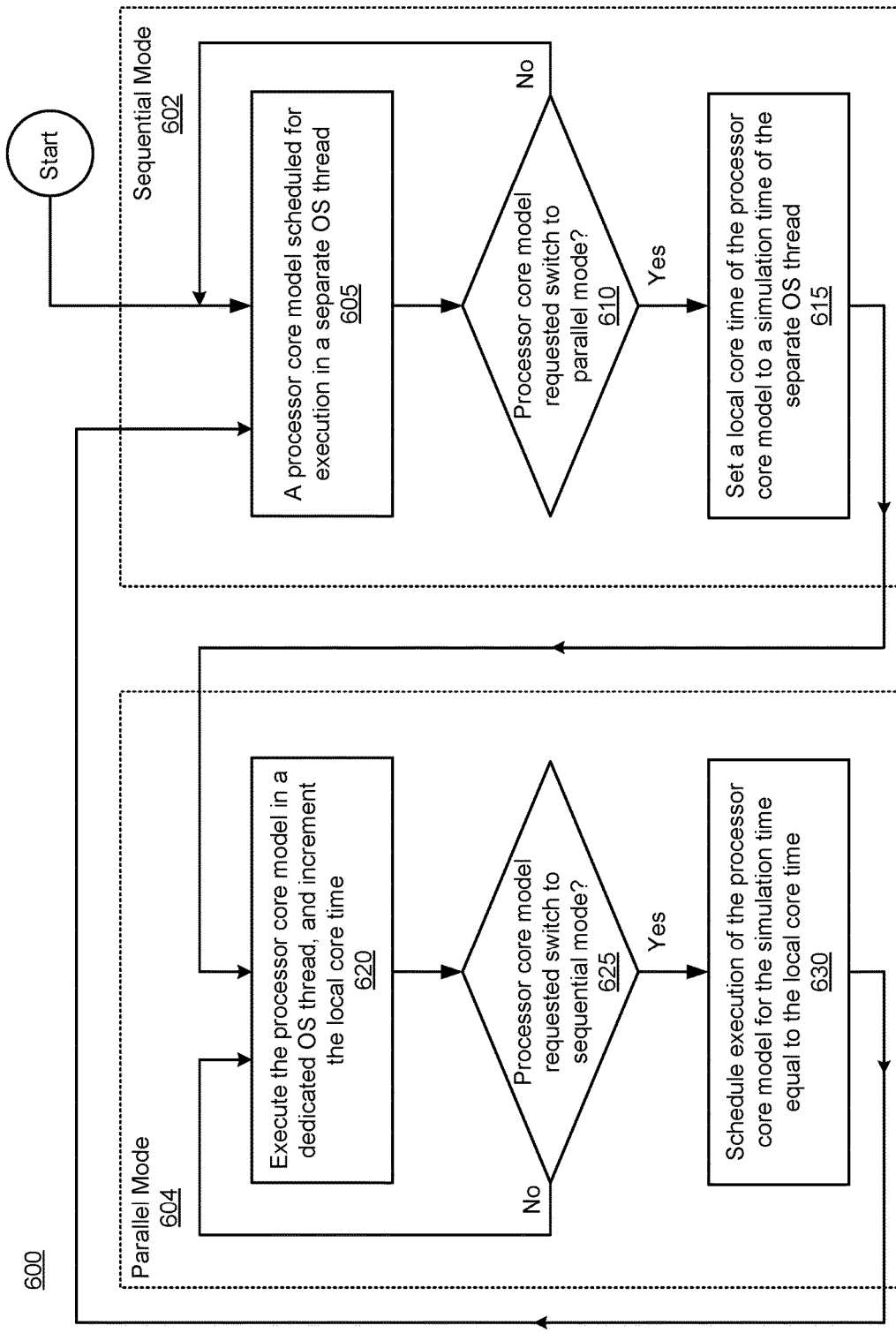
FIG. 6A is a flow chart illustrating a process of switching execution of a processor core model between a parallel mode and a sequential mode, in accordance with an embodiment.

FIG. 6A is a flow chart 600 illustrating a process of switching execution of a processor core model between a parallel mode and a sequential mode, in accordance with an embodiment. As shown in FIG. 6A, the processor core model (e.g., any of the processor core models 105, 110, 115, 120 in FIG. 1) can operate in one of two modes, such as a sequential mode 602 and a parallel mode 604. In the sequential mode 602, operations of the processor core model are scheduled for sequential execution at certain simulation times by the simulation kernel 135 in the ROTS OS thread 230 separate from OS threads that execute in parallel operations of other processor core models. In the parallel mode 604, the processor core model and one or more other processor core models are executed in parallel, each processor core model being executed in a different OS thread.

During initialization of the virtual prototype simulation 100 in FIG. 1, the processor core model can be created and scheduled by the virtual prototype simulation 100 to operate in the sequential mode 602. At block 605, the processor core model is scheduled for execution in the ROTS OS thread 230 that also executes operations of the ROTS 130 scheduled at certain simulation times by the simulation kernel 135 . At decision block 610, the processor core model may request sequential re-scheduling at a later time instant of the ROTS OS thread 230. Alternatively, at the decision block 610, the processor core model may transition to the parallel mode 604. Before switching to the parallel mode 604, at block 615, a local core time of the processor core model switching to the parallel mode 604 is set to a global simulation time, i.e., the local core time is set to a simulation time of the ROTS OS thread 230.

In the parallel mode 604, at block 620, the processor core model is executed in a dedicated OS thread and the local core time of the processor core model is incremented. In the parallel mode 604, the processor core model can be executed in parallel with one or more other processor core models. Each processor core model in the parallel mode 604 is executed in a different OS thread and advances a local core time within a sliding time window. The processor core models in the parallel mode 604 can run concurrently on a multi-core host computer. When in the parallel mode 604, the processor core model is configured to execute internal operations freely. The processor core model updates its own local core time periodically as the processor core model executes a corresponding number of cycles. The processor core model executes, at the block 620, operations in its own dedicated OS thread and increments the local core time within the sliding time window, as long as the processor core model does not request switch to the sequential mode 602, e.g., as in decision block 625.

In some embodiments, the processor core model in the parallel mode 604 receives a request for execution of an external operation at a current local core time. For example, the processor core model receives an IRQ from the ROTS OS thread 230. Based on the received request for execution of the external operation, the processor core model may request, at the decision block 625, to switch back to the sequential mode 602. At block 630, a sequential execution of the processor core model is scheduled for the global simulation time equal to the current local core time of the processor core model. After that, the processor core model can be dispatched to the simulation kernel 135 and executed, at the block 605, in the ROTS OS thread 230. When the processor core model is done with the sequential execution of the external operation in the ROTS OS thread 230, the processor core model may switch back from the sequential mode 602 to the parallel mode 604, e.g., after the decision block 610. Before switching back to the parallel mode 604, the local core time of the processor core model is set to the global simulation time, at the block 615.

Figure 6B:
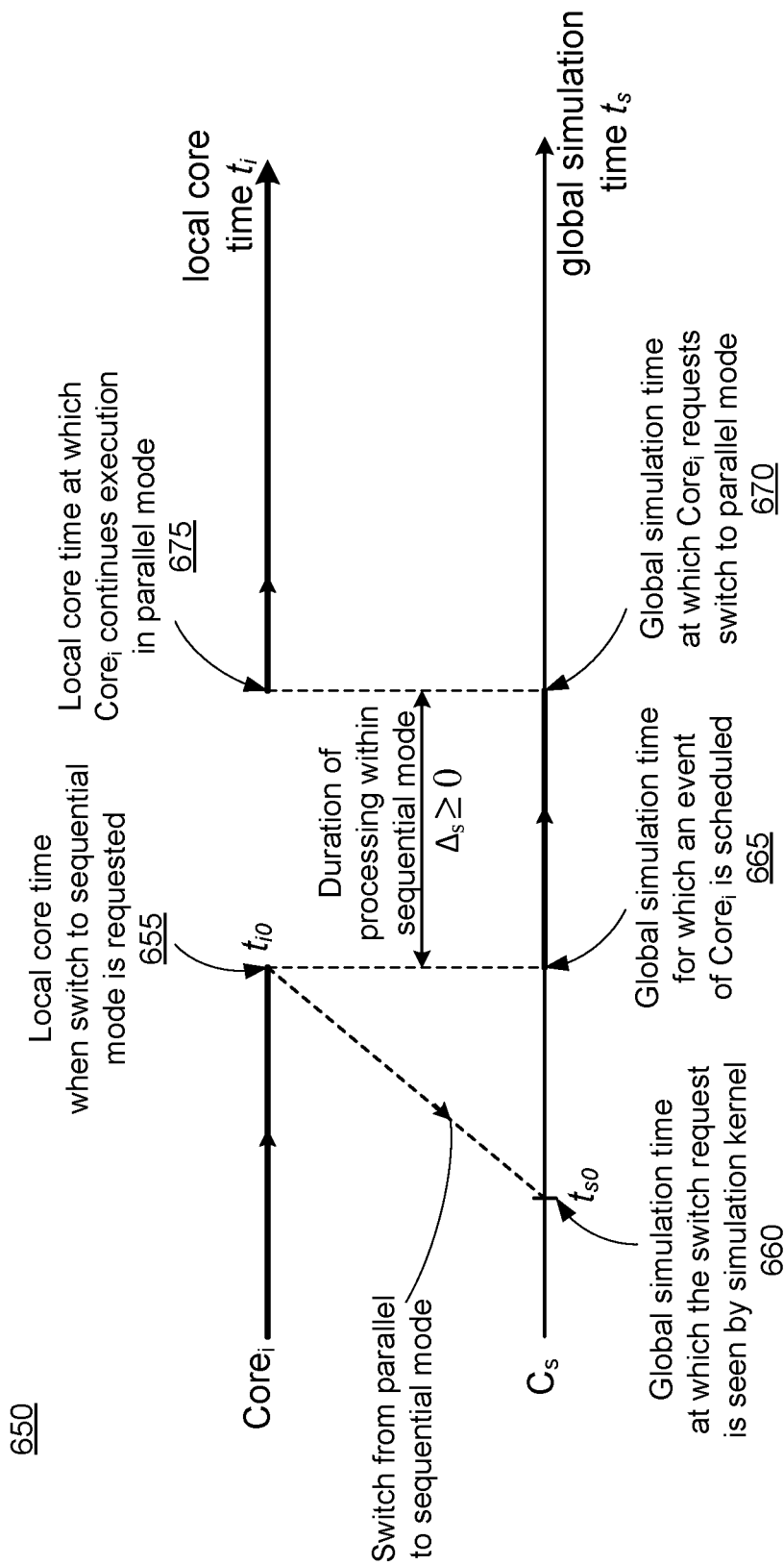
FIG. 6B illustrates an example of a processor core model switching from the parallel mode to the sequential mode and back to the parallel mode, in accordance with an embodiment.

FIG. 6B illustrates an example 650 of a processor core model switching from the parallel mode 604 to the sequential mode 602 and back to the parallel mode 604, in accordance with an embodiment. A parallel running processor core model, such as processor core model $Core_i$ shown in FIG. 6B, can request switching into the sequential mode 602 at any local core time, $t_i$, such as at the decision block 625 in FIG. 6A. In the sequential mode 602, operations of the processor core model $Core_i$ are executed in an OS thread controlled by a simulation kernel $C_s$ having a global simulation time, $t_s$, as shown in FIG. 6B. As the global simulation time, $t_s$, is always lagging behind relative to the local core time $t_i$, the request for switching from the parallel execution mode 604 to the sequential execution mode 602 is seen in the present or future of the simulation kernel, thus avoiding causality errors. If a parallel running OS thread executing operations of the processor core model $Core_i$ requests a switch to the sequential execution mode 602 at a local core time 655, $t_{i0}$, the switch request is seen by the simulation kernel at a global simulation time 660, $t_{s0}$. In the illustrative embodiment shown in FIG. 6B, the global simulation time 660, $t_{s0}$, is smaller than the local core time 655, $t_{i0}$. In general, the global simulation time 660 cannot be ahead of the local core time 655, i.e., $t_{s0} \le t_{i0}$.

Functionality of the processor core model $Core_i$ associated with an event scheduled in the simulation kernel at the requested local core time 655 will be executed, e.g., at the block 605 in FIG. 6A, as soon as the global simulation time reaches the requested local core time 655. Thus, as shown in FIG. 6B, the simulation kernel $C_s$ can schedule execution of the functionality of the processor core model $Core_i$ at the global simulation time 665 equal to the local core time 655 when the switch was requested. As further shown in FIG. 6B, the execution of functionality of the processor core model $Core_i$ in the sequential mode 602 can consume an amount $\Delta_s$ of the global simulation time. Other parallel running processor core models are not affected by the switching mechanism shown in FIG. 6B. During a period of sequential execution, the OS thread controlled by the simulation kernel will not contribute to bounds of the sliding time window. After spending some time in the sequential execution mode 602 that may involve executing multiple sequential activations of the processor core model functionality, e.g., the amount of time $\Delta_s \ge 0$, the processor core model can request to switch back to the parallel execution mode 604 at a global simulation time 670, e.g., at the decision block 610 in FIG. 6A. A local core time of the processor core model in the parallel execution mode 604 will be set, e.g., at the block 615 in FIG. 6A, to be equal to the global simulation time 670 of the simulation kernel when switching from the sequential execution mode 602 to the parallel execution mode 604 is requested. Thus, as shown in FIG. 6B, the local core time 675 of the processor core model $Core_i$ in the parallel execution mode 604 is set to the value of the global simulation time 670. The processor core model $Core_i$ continues execution of operations in the parallel running OS thread from the local core time 675, which in consequence may further increase the local core time, $t_i$.

Figure 7:
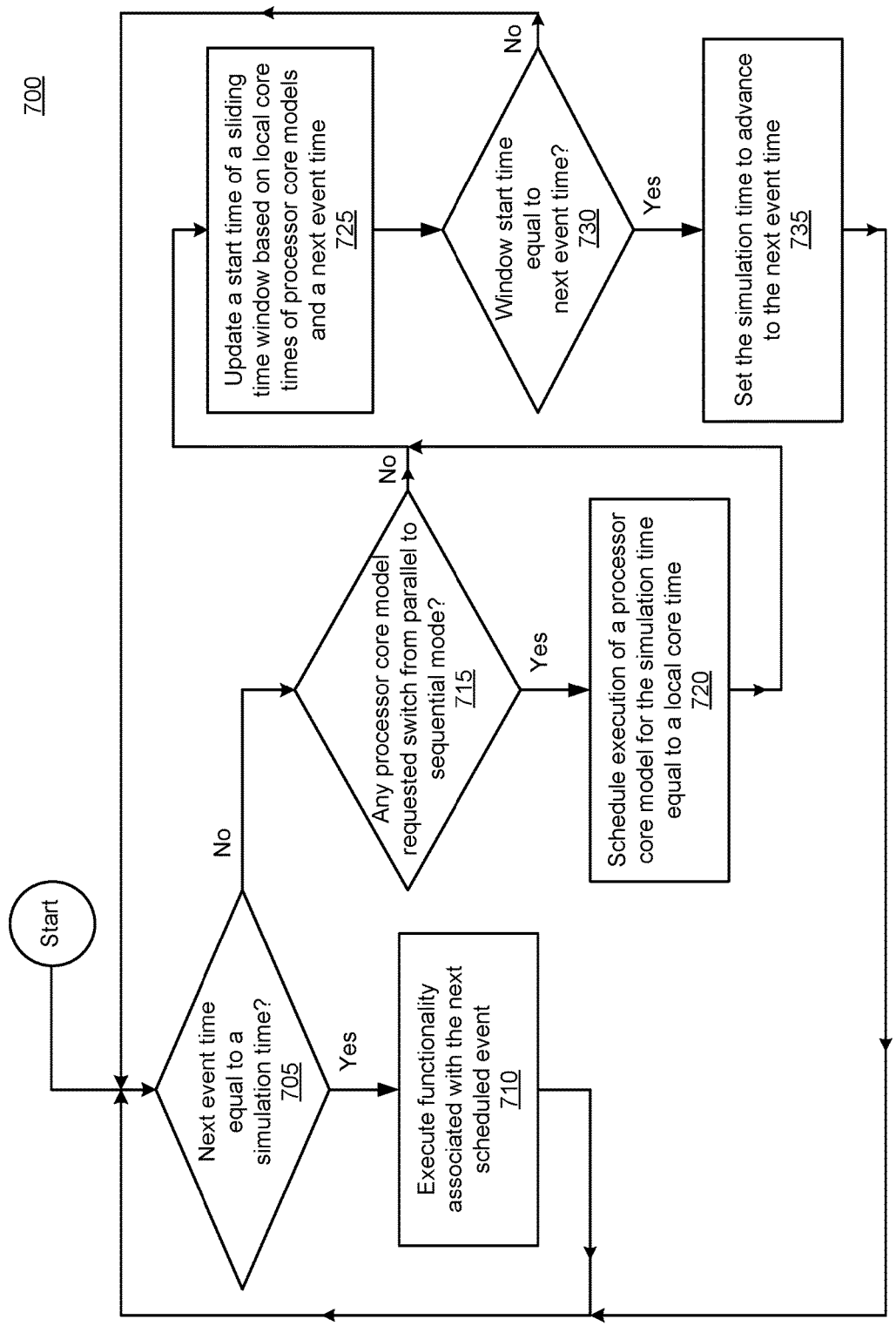
FIG. 7 is a flow chart illustrating a ROTS OS thread for processing events and executing operations of ROTS, in accordance with an embodiment.

FIG. 7 is a flow chart 700 illustrating a ROTS OS thread for processing events and executing functionality (operations) of the ROTS 130, in accordance with an embodiment. At decision block 705, it is determined whether a next event in an event queue of a simulation kernel is scheduled for processing at a current simulation time of the ROTS OS thread, such as whether a next event time is equal to the simulation time. If the next event time is equal to the simulation time, the event is removed from the event queue and functionality of the ROTS 130 associated with the event is executed, at block 710. The execution of the functionality of the ROTS 130 associated with the event at the current simulation time may cause the simulation kernel to add one or more new events to the event queue. In an embodiment, the simulation kernel can schedule the one or more new events even for the current simulation time.

Once all events scheduled for the current simulation time have been processed, the ROTS OS thread inspects all processor core models to determine if any of the processor core models has requested transition from the parallel mode to the sequential mode, at decision block 715. For any such processor core model that requested switch of execution from a dedicated OS thread to the ROTS OS thread, the simulation kernel may schedule, at block 720, execution of the processor core model on the event queue for a local core time of the processor core model. Note that the local core time of the processor core model is either at the simulation time of the ROTS OS thread or past the simulation time of the ROTS OS thread.

At block 725, the ROTS OS thread updates a start time of a sliding time window based on local core times of processor core models in the parallel mode and a time of a next scheduled event in the event queue of the simulation kernel, i.e., a next event time. According to equation (1), the start time of the sliding time window can be determined as a minimum of each local core time of a processor core model executed in parallel and the next event time.

At block 730, if the updated start time of the sliding time window is equal to the next event time, then at block 735 the global simulation time is advanced by setting the global simulation time to the next event time. The start time of the sliding time window is updated to advance to the next event time when two conditions are satisfied. First, all processor core models that are in the sequential mode have events scheduled for the current global simulation time or for some times in the future relative to the current global simulation time. Second, all processor core models that are in the parallel mode have progressed in parallel execution within the sliding time window such that their local core times are larger than or equal to the next event time.

At block 730, if the updated start time of the sliding time window is not equal to the next event time, then the ROTS OS thread executing functionality of the ROTS may enter a loop and return to block 705 without advancing the simulation time. During the loop of the ROTS OS thread (e.g., a flow through blocks 705, 715, 725, 730 in FIG. 7), the start time of the sliding time window may be updated based on the local core times of the processor core models running in parallel, as the local core times of the parallel processor core models may advance during the loop of the ROTS OS thread. Thus, during the loop of the ROTS OS thread, one or more of the local core times of the processor core models executed in parallel within the sliding time window can change, as well as the start time of the sliding time window.

At the block 720, a processor core model may have requested transition from the parallel mode to the sequential mode. In this case, the simulation kernel schedules a sequential processing of one or more events of the processor core model for the simulation time equal to a local core time of the processor core model. If the processor core model that has requested transition from the parallel mode to the sequential mode is the currently slowest of all processor core models running in parallel and the local core time of the processor core model is earlier than a next event time of the simulation kernel, an event of the processor core model will be scheduled at a front of the event queue resulting in the next event time being set to the local core time of the processor core model. Then, the start time of the sliding time window is updated, at the block 725, to advance to the next event time, which is actually the local core time of the processor core model that switched execution to the sequential mode. Because the start time of the sliding time window is equal to the next event time, as determined at the decision block 730, at block 735 the simulation time advances to the next event time. This advances the simulation time to the start of the sliding time window. One or more events of the processor core model that switched execution from the parallel mode to the sequential mode can be processed at the current simulation time, at the block 710.

Figure 8:
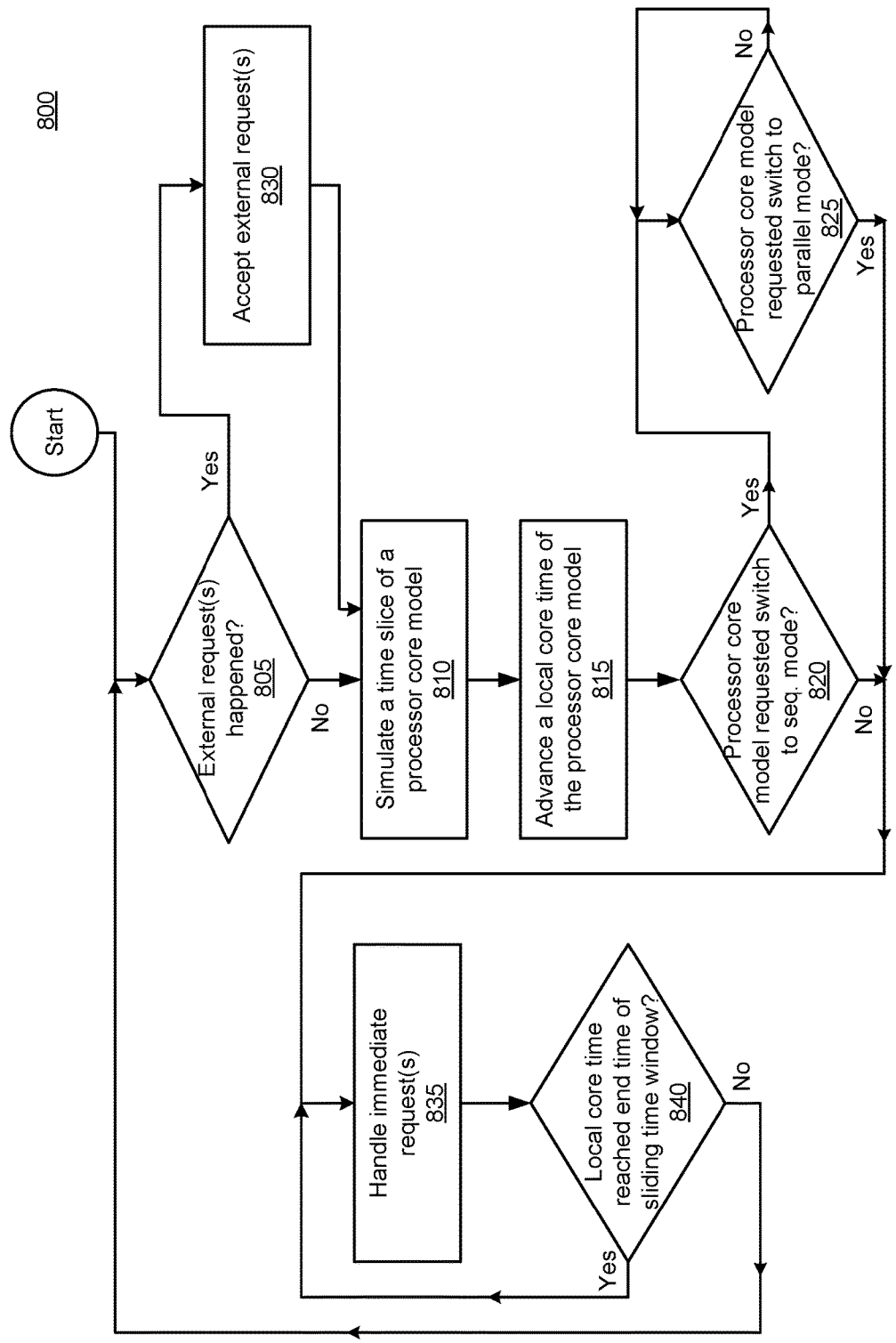
FIG. 8 is a flow chart illustrating a dedicated OS thread for processing events and executing operations of a processor code model, in accordance with an embodiment.

FIG. 8 is a flow chart 800 illustrating a dedicated OS thread for executing a processor code model in the parallel mode, in accordance with an embodiment. Each dedicated OS thread for execution of a processor core model in the parallel mode may operate the state machine 800. Initially, there are no external request(s), e.g., determined at decision block 805. As long as the processor core model is in the parallel mode and a local core time of the processor core model is smaller than a sum of a start time of a sliding time window and a size of the sliding time window, the processor core model is allowed to simulate a time slice of the processor core model, at block 810. During the time slice, the processor core model simulates execution of an operation that includes a certain number of instructions of the processor core model, e.g., at the block 810. The number of instructions simulated by the processor core model in the time slice may be configurable. However, the number of instructions simulated in the time slice may not exceed a number of instructions that can be executed in a time difference between the local core time of the processor core model and the sum of the start time of the sliding time window and the size of the sliding time window. The local core time of the processor core model advances during the simulation of the time slice, at block 815. The dedicated OS thread of the processor core model may prevent advancing the local core time of the processor core model past the sum of the start time of the sliding time window and the size of the sliding time window, i.e., past an end time of the sliding time window.

In some embodiments, the end of the sliding time window can be treated as a hard boundary that is never crossed when executing instructions of the processor core model. In this case, before start executing instructions for a next time slice, the dedicated OS thread of the processor core model confirms that the local core time of the processor core model is still at least the time slice away from the current end of the sliding time window. In alternate embodiments, the end of the sliding time window can be treated as a soft boundary that may be overstepped when executing instructions of the processor core model during the current time slice. When executing instructions of the current time slice, the dedicated OS thread of the processor core model blocks instructions of a next time slice until the sliding time window has caught up with the current local core time of the processor core model. In this case, the dedicated OS thread of the processor core model starts a time slice as long as the end of the sliding time window has not been reached yet. During execution of the instructions of the current time slice, the local core time of the processor core model may potentially run over the end of the sliding time window by at most one time slice. Both of these methods for simulating instructions of a processor core model during a time slice lead to largely similar behavior of the virtual prototype simulation. The soft boundary method can be viewed as a version of the hard boundary method where the sliding time window size is increased by one time slice.

The size of the sliding time window may not affect correctness of the simulation. What is relevant for correctness of the simulation is that no parallel running processor core model may ever have a local core time that is earlier than the global simulation time, which is not related to the calculations performed at the end of the sliding time window and a size of the sliding time window.

During simulation of the time slice at blocks 810-815, the processor core model may request switching of execution from the dedicated OS thread to a ROTS OS thread that processes events and executes functionality of ROTS. This is in effect, a request to switch execution from the parallel mode to the sequential mode. If the processor core model has requested switching of execution to the sequential mode, which is determined at decision block 820, then at block 825 the state machine 800 of the dedicated OS thread enters a loop where the dedicated OS thread stays until the processor core model requests to switch execution back to the parallel mode and to the dedicated OS thread.

At block 835, as long as the processor core model is executed in the dedicated OS thread in the parallel mode and the local core time of the processor core model is smaller than the sum of the start time of the sliding time window and the size of the sliding time window, the processor core model is allowed to accept and handle one or more external requests. The processor core model may simulate the time slice at block 810, such as by handling execution of the one or more external requests. One example of handling an external request is processing, by the dedicated OS thread, an IRQ from the ROTS OS thread.

At block 840, if it is determined that the processor core model is in the parallel mode but the local core time of the processor core model has reached the end of the sliding time window (sum of the start time of the sliding time window and the size of the sliding time window), the dedicated OS thread runs a loop and proceeds to block 835 where the dedicated OS thread may handle one or more immediate requests if available. The dedicated OS thread stays in this loop until the start time of the sliding time window is advanced by the ROTS OS thread such that the local core time is now smaller than the sum of the start time of the sliding time window and the size of the sliding time window.

The handling of immediate and external requests as shown in FIG. 8 is one possible implementation of a mechanism to achieve interaction between the dedicated OS thread of the processor core model and the ROTS OS thread executing functionality of the ROTS. When the processor core model is in the parallel mode, the dedicated OS thread may execute operations of the processor core model concurrently with execution of operations of the ROTS in the ROTS OS thread. The ROTS can be configured to interact with the processor core model in various ways.

In some embodiments, the processor core model is configured to react to one or more external requests. For example, the processor core model reacts to signals or operations that originate from the ROTS and have targets within the processor core model. Some examples of external requests are: processor interrupts, changes of clock parameters, changes of reset lines, etc. The ROTS can be configured to interact in a thread-safe manner with the processor core model to communicate external requests to the processor core model. Because external requests are asynchronous events, the ROTS can proceed with execution within the ROTS OS thread without waiting for the processor core model to complete processing of external requests. External requests are scheduled with the processor core model, and the external requests are processed at specific time instances by the processor core model.

In some other embodiments, the ROTS can be required to send immediate (synchronous) requests to the processor core model for immediate processing. However, the ROTS may not be able to proceed with its own execution within the ROTS OS thread until the processor core model has processed an immediate request received from the ROTS. Because of that, the processor core model may be configured to schedule the immediate request for immediate processing and execution of one or more operations associated with the immediate request. An example of the request for immediate processing by the processor core model is a request for invalidation of DMI regions. Other examples of requests for immediate processing by the processor core model are: requests to stop the simulation, requests for setting breakpoints, requests for reading analysis data from the processor core model, etc. The invalidation of DMI regions is complete when each processor core model sends, such as to the simulation kernel of the ROTS, an acknowledgment for the immediate request. The immediate request, such as the DMI invalidation request, prevents the ROTS from proceeding its own execution within the ROTS OS thread. The ROTS thread can proceed when the immediate request has been processed by the processor core model. Therefore, the processor core model receiving an immediate request, such as a DMI invalidation request, is configured to process the received request immediately. Otherwise, the virtual prototype simulation could enter a deadlock. Because of that, the processor core model is configured to handle an extra class of immediate requests, which are processed even if the processor core model is currently blocked from executing instructions or handling external requests. Thus, the processor core model is configured to handle the immediate requests within its dedicated OS thread even though the current local core time of the processor core model has reached the end time of the sliding time window.

Note that the synchronization between the ROTS and the processor core model for handling external and immediate requests is not required if the processor core model that is a recipient of the external/immediate requests is currently being executed in the sequential mode within the ROTS OS thread. In this case, the ROTS OS thread executing operations of the ROTS can directly invoke a mechanism in the processor core model for handling external/immediate requests without running into threading issues. Alternatively, when an immediate or an external request needs to be processed while a recipient processor core model is executed in the parallel mode, a mechanism described in more detail below can be invoked.

In some embodiments, the ROTS OS thread executing operations of the ROTS writes an indication (e.g., an external request flag) of an external request into an external request queue of the processor core model to signal to the dedicated OS thread an occurrence of an external request (e.g., an IRQ from the ROTS OS thread). For example, the ROTS OS thread 230 of the ROTS 130 writes an indication into the external request queue 425 to signal to the OS thread 205 of the processor sore model 105 occurrence of IRQ from the simulation kernel 135. When the external request happens, the external request can be enqueued with the external request queue of the processor core model from the ROTS OS thread executing functionality of the ROTS. The state machine 800 of the dedicated OS thread in FIG. 8 checks the external request queue, at the decision block 805. If the external request queue contains an indication about at least one external request, the processor core model accepts and handles the at least one external request indicated in the external request queue, at the block 830. In alternate embodiments, occurrence of external requests can be handled by the dedicated OS thread using a data structure different from an external request queue. For example, the data structure of the dedicated OS thread can be a set of state variables, Boolean flags, etc.

Note that the processing of one or more external requests within the processor core model may require access to resources that can be accessed only from the ROTS OS thread executing functionality of the ROTS. Therefore, the processing of one or more external requests may require transition of execution of the processor core model from the parallel mode into the sequential mode, such as switching of execution of the processor core model from the dedicated OS thread of the processor core model to the ROTS OS thread. If the required resources are only accessible from the ROTS OS thread, an alternative mechanism can be applied. When the external request flag in the external request queue of the processor core model is set by the ROTS OS thread, the processor core model is configured to switch execution from the parallel mode to the sequential mode, and the processor core model eventually continues execution in the ROTS OS thread. After handling of the one or more external requests initiated by the ROTS OS thread is finished, the processor core model may transition back to the parallel execution mode.

Handling of immediate (synchronous) requests is different from the handling of external (asynchronous) requests described above. In one embodiment, the ROTS OS thread executing functionality of the ROTS sets an immediate request flag of the processor core model when the ROTS requests the processor core model to handle an immediate request. For example, the ROTS OS thread 230 of the ROTS 130 sets the immediate request flag 435 of the processor core model when the simulation kernel 135 requests the processor sore model 105 to handle an immediate request. The processor core model may check a state of the immediate request flag, such as through polling. When the immediate request flag is set, the processor core model handles the request immediately at block 835 in FIG. 8. For example, the processor core model may perform invalidation of one or more DMI regions. The dedicated OS thread of the processor core model is configured to handle the immediate request even if a current local core time of the processor core model has reached an end time of the sliding time window, as determined at the decision block 840. Once the processing of the immediate request by the processor core model is finished, the processor core model may be configured to reset the immediate request flag in order to signal to the ROTS OS thread that the immediate request has been processed and that the ROTS can proceed with its own execution within the ROTS OS thread. During the processing of the immediate request, the ROTS OS thread may repeatedly check the status of the immediate request flag through polling, while execution of the ROTS OS thread is stopped. The ROTS OS thread continues the execution when the immediate request flag has been reset by the dedicated OS thread of the processor core model. The method described above for handling immediate requests via an immediate request flag is one possible mechanism to store and forward immediate requests. Other mechanisms for storing and forwarding immediate requests implemented at an interface between the ROTS and the processor core model are supported in the present disclosure.

In an alternate embodiment, the processing of immediate requests within the processor core model may require access to resources that can be accessed only from the ROTS OS thread executing functionality of the ROTS. Therefore, the processing of immediate request may require transition of execution of the processor core model from the parallel mode into the sequential mode, such as by switching of execution of the processor core model from the dedicated OS thread of the processor core model to the ROTS OS thread. When the immediate request flag in in the processor core model is set by the ROTS OS thread, the processor core model is configured to switch execution from the parallel mode to the sequential mode. The processor core model eventually continues processing of the immediate request in the ROTS OS thread. Meanwhile, the ROTS OS thread stops processing of other events, such as regular events of the ROTS. After processing of the immediate request initiated by the ROTS OS thread is finished (e.g., DMI regions are invalidated), the processor core model may transition back to the parallel execution mode and the ROTS OS thread may return to processing of the regular events of the ROTS.

In some embodiments, the ROTS OS thread dispatches multiple immediate requests simultaneously to multiple OS threads dedicated for concurrent execution of processor core models. For example, the ROTS OS thread dispatches requests for synchronous invalidation of DMI regions to different processor core models running in parallel. The processor core models can then process the immediate requests in parallel in the dedicated OS threads. For example, various DMI regions can be simultaneously invalidated. The ROTS OS thread is configured to continue execution of events of the ROTS when all the processor core models are finished with processing the immediate requests.

Figure 9:
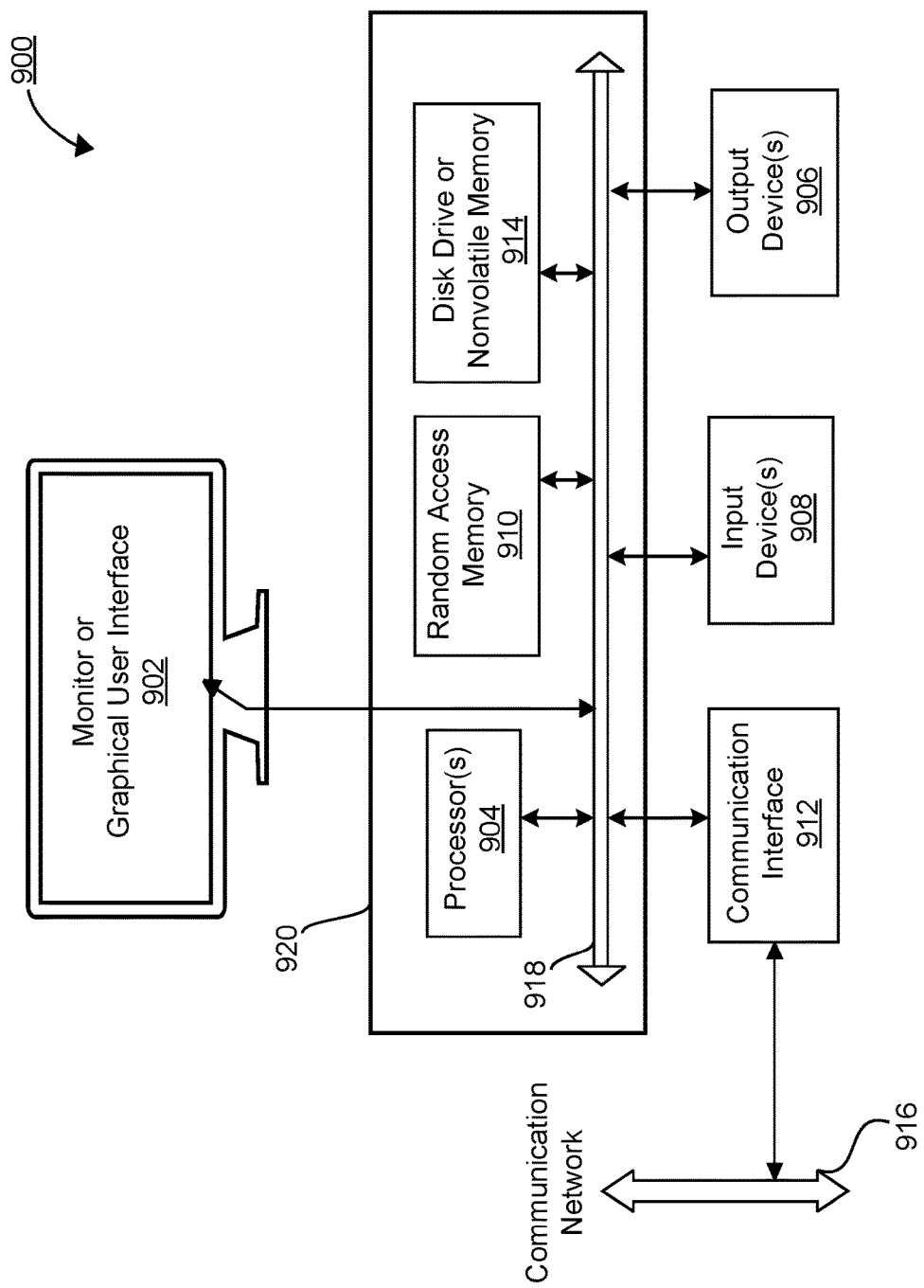
FIG. 9 is an example block diagram of a computer system that may perform the virtual prototype simulation in FIG. 1, in accordance with an embodiment.

FIG. 9 is an example block diagram of a computer system 900 that may perform a virtual prototype simulation (e.g., the virtual prototype simulation 100 in FIG. 1), in accordance with an embodiment. FIG. 9 is merely illustrative of a machine system to carry out aspects of the technical processes described herein, and does not limit the scope of the claims. One of ordinary skill in the art would recognize other variations, modifications, and alternatives. In one embodiment, the computer system 900 typically includes a monitor or graphical user interface 902, a computer 920, a communication network interface 912, input device(s) 908, output device(s) 906, and the like.

As shown in FIG. 9, the computer 920 may include one or more processor(s) 904 that communicate with a number of peripheral devices via a bus subsystem 918. These peripheral devices may include the input device(s) 908, the output device(s) 906, the communication network interface 912, and a storage subsystem, such as a random access memory 910 and a disk drive or nonvolatile memory 914.

The input device(s) 908 include devices and mechanisms for inputting information to the computer 920. These may include a keyboard, a keypad, a touch screen incorporated into the monitor or graphical user interface 902, audio input devices such as voice recognition systems, microphones, and other types of input devices. In various embodiments, the input device(s) 908 are typically embodied as a computer mouse, a trackball, a track pad, a joystick, wireless remote, drawing tablet, voice command system, eye tracking system, and the like. The input device(s) 908 typically allow a user to select objects, icons, text and the like that appear on the monitor or graphical user interface 902 via a command such as a click of a button or the like.

The output device(s) 906 include all possible types of devices and mechanisms for outputting information from the computer 920. These may include a display (e.g., monitor or graphical user interface 902), non-visual displays such as audio output devices, etc.

The communication network interface 912 provides an interface to communication networks (e.g., the communication network 916) and devices external to the computer 920. The communication network interface 912 may serve as an interface for receiving data from and transmitting data to other systems. Embodiments of the communication network interface 912 typically include an Ethernet card, a modem (telephone, satellite, cable, Integrated Services Digital Network (ISDN)), (asynchronous) digital subscriber line (DSL) unit, FireWire interface, Universal Serial Bus (USB) interface, and the like. For example, the communication network interface 912 may be coupled to the communication network 916 via a FireWire bus, or the like. In other embodiments, the communication network interface 912 may be physically integrated on the motherboard of the computer 920, and may be a software program, such as soft DSL, or the like.

In various embodiments, the computer system 900 may also include software that enables communications over a network such as the Hypertext Transfer Protocol (HTTP), Transmission Control Protocol/Internet Protocol (TCP/IP), Real-time Transport Protocol/Real Time Streaming Protocol (RTP/RTSP), and the like. In alternative embodiments, other communications software and transfer protocols may also be used, for example Internetwork Packet Exchange (IPX) protocol, User Datagram Protocol (UDP) or the like. In some embodiments, the computer 920 in the processor(s) 904 may include one or more microprocessors from Intel®. Further, one embodiment, the computer 920 includes a UNIX-based operating system.

The random access memory 910 and the disk drive or nonvolatile memory 914 are examples of tangible media configured to store data and instructions to implement various embodiments of the processes described herein, including executable computer code, human readable code, or the like. Other types of tangible media include floppy disks, removable hard disks, optical storage media such as CD-ROMs, DVDs and bar codes, semiconductor memories such as flash memories, non-transitory read-only-memories (ROMs), battery-backed volatile memories, networked storage devices, and the like. The random access memory 910 and the disk drive or nonvolatile memory 914 may be configured to store the basic programming and data constructs that provide the functionality of the disclosed processes and other embodiments thereof that fall within the scope of the present disclosure.

Software code modules and instructions that implement embodiments of the present disclosure may be stored in the random access memory 910 and/or the disk drive or nonvolatile memory 914. These software modules may be executed by the processor(s) 904. The random access memory 910 and the disk drive or nonvolatile memory 914 may also provide a repository for storing data used by the software modules.

The random access memory 910 and the disk drive or nonvolatile memory 914 may include a number of memories including a main random access memory (RAM) for storage of instructions and data during program execution and a read only memory (ROM) in which fixed non-transitory instructions are stored. The random access memory 910 and the disk drive or nonvolatile memory 914 may include a file storage subsystem providing persistent (non-volatile) storage for program and data files. The random access memory 910 and the disk drive or nonvolatile memory 914 may include removable storage systems, such as removable flash memory.

The bus subsystem 918 provides a mechanism for letting the various components and subsystems of computer 920 communicate with each other as intended. Although the communication network interface 912 is depicted schematically as a single bus, alternative embodiments of the bus subsystem 918 may utilize multiple busses.

FIG. 9 is representative of a computer system capable of implementing embodiments of the present disclosure. It will be readily apparent to one of ordinary skill in the art that many other hardware and software configurations are suitable for use with embodiments of the present disclosure. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

In one embodiment, the embodiments described herein can also be used in a hybrid emulation environment. Hybrid emulation combines emulation and virtual prototyping to enable earlier architecture validation and software development, as well as higher performance for software-driven hardware verification even when register-transfer level (RTL) design for critical blocks isn't available. For the hardware architect, it enables RTL processor subsystems loaded into an emulator to serve as a high-performance, cycle-accurate model for SoC performance and architecture validation through cycle accurate interfaces to SystemC models of other blocks like memory controllers and subsystems in the virtual platform. For the software developer, instruction accurate models in the virtual prototype are used for software development with the remaining SoC design blocks running at high speed in the emulator. For the verification engineer, pre-verified processor subsystem blocks can be moved out of the emulator and executed on the host platform using a virtual prototype of the processor subsystem, freeing up emulator capacity while increasing overall performance.

In hybrid emulation, a portion (e.g. graphics processing unit, USB controller) of a design under test (DUT) is emulated in a hardware emulation system such as Synopsys ZeBu. The emulated portion of the design may be written in a register transfer language that is synthesized into logic gates or other representation and then loaded into the field programmable gate arrays (FPGAs) of the emulator. Another portion (e.g. the processors) of the design under test may be represented by a model that is simulated in a simulation system, such as a host computing device. For example, a virtual prototype of the processor may be simulated the simulation system. The simulation system and the emulation system can communicate with each other during the hybrid emulation. Hybrid emulation can also be referred to as co-simulation and emulation. The DUT may represent an integrated circuit such as a SoC, or a computing device with multiple chips.

In one embodiment, the sliding time window technique described herein can be utilized in the simulation portion of a hybrid emulation to speed up the simulation.

Various embodiments of the present disclosure may be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present disclosure. The logic may form part of a computer program product adapted to direct an information-processing device to perform a set of steps disclosed in embodiments of the present disclosure. Based on the disclosure and teachings provided herein, a person of ordinary skill in the art will appreciate other ways and/or methods to implement the present disclosure.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), FPGAs, dedicated or shared processors, and/or other hardware modules or apparatuses now known or later developed.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for parallel execution of a plurality of processor core models, the method comprising:
   executing the plurality of processor core models in parallel within a sliding time window of a defined size, each processor core model being executed in a different corresponding thread and advancing a local core time within the sliding time window;
   executing one or more hardware models and a simulation kernel in a separate thread, the separate thread having a global simulation time and a plurality of simulation events;
   running the separate thread without advancing the global simulation time until a start time of the sliding time window reaches a next event time of a next event of the simulation events that is scheduled for processing; and
   advancing the sliding time window by updating the start time without advancing the global simulation time until the start time reaches the next event time, based on the local core time of each processor core model and the next event time.

2. The method of claim 1, wherein each processor core model is prevented from advancing the local core time past an end of the sliding time window.

3. The method of claim 1, wherein each processor core model is configured to advance the local core time past an end of the sliding time window only to allow finishing execution of a predefined number of instructions of that processor core model in a time slice when a start of the time slice is within the sliding time window.

4. The method of claim 1 wherein the separate thread is prevented from advancing the global simulation time past the start time of the sliding time window.

5. The method of claim 1 wherein updating the start time of the sliding time window comprises:
   calculating the start time as a minimum of the local core time of each processor core model and the next event time.

6. The method of claim 1, further comprising:
   updating the start time of the sliding time window when the separate thread finishes execution of one or more operations associated with one or more events of the plurality of simulation events scheduled for a current time instance of the global simulation time.

7. The method of claim 1, further comprising:
   switching, at a current local core time, execution of a processor core model of the plurality of processor core models to the separate thread; and
   scheduling execution of the processor core model within the separate thread for the global simulation time equal to the current local core time of the processor core model.

8. The method of claim 1, further comprising:
   switching, at a current local core time, execution of a processor core model of the plurality of processor core models to the separate thread;
   scheduling an event of the processor core model for a time instance of the global simulation time being equal to the current local core time of the processor core model;
   inserting the new event into an event queue of the simulation kernel;
   scheduling execution of the processor core model within the separate thread for the time instance of the global simulation time;
   advancing the global simulation time to the time instance, responsive to the time instance being the earliest scheduled simulation time among all scheduled times of events in the event queue; and
   updating the start time of the sliding time window to be equal to the time instance, responsive to the current local core time of the processor core model lagging behind the local core time of each processor core model executed in parallel and the time instance being the earliest scheduled simulation time in the event queue.

9. The method of claim 8, further comprising:
   setting the local core time of the processor core model to the global simulation time; and
   switching execution of the processor core model from the separate thread back to the corresponding thread for the processor core model, when handling of the event is finished.

10. The method of claim 1, further comprising:
    accepting, by a processor core model of the plurality of processor core models, one or more external requests from the separate thread;
    switching execution of the processor core model to the separate thread, responsive to accepting the one or more external requests;

handling the one or more external requests by the processor core model within the separate thread; and switching execution of the processor core model from the separate thread back to the corresponding thread for the processor core model, when the handling of the one or more external requests is finished.

11. The method of claim 1, further comprising:

accepting, by a processor core model of the plurality of processor core models, one or more external requests from the separate thread; and handling the one or more external requests by the processor core model within the corresponding thread for the processor core model.

12. The method of claim 1, further comprising:

accepting, by a processor core model of the plurality of processor core models, one or more immediate requests from the separate thread;

preventing the or more hardware models and the simulation kernel from execution within the separate thread until handling of the one or more immediate requests is finished;

handling the one or more immediate requests by the processor core model within the corresponding thread for the processor core model; and continuing execution of the separate thread when handling of the one or more immediate requests is finished.

13. The method of claim 12, further comprising:

handling the one or more immediate requests by the processor core model within the corresponding thread for the processor core model when the local core time of the processor core model reached an end of the sliding time window.

14. A non-transitory computer-readable medium comprising computer-executable instructions for parallel execution of a plurality of processor core models, the instructions when executed by one or more processors cause the one or more processors to:

execute the plurality of processor core models in parallel within a sliding time window of a defined size, each processor core model being executed in a different corresponding thread and advancing a local core time within the sliding time window;

execute one or more hardware models and a simulation kernel in a separate thread, the separate thread having a global simulation time and a plurality of simulation events;

run the separate thread without advancing the global simulation time until a start time of the sliding time window reaches a next event time of a next event of the simulation events that is scheduled for processing; and advance the sliding time window by updating the start time without advancing the global simulation time until the start time reaches the next event time, based on the local core time of each processor core model and the next event time.

15. The computer-readable medium of claim 14, wherein each processor core model is prevented from advancing the local core time past an end of the sliding time window.

16. The computer-readable medium of claim 14, wherein each processor core model is configured to advance the local core time past an end of the sliding time window only to allow finishing execution of a predefined number of instructions of that processor core model in a time slice when a start of the time slice is within the sliding time window.

17. The computer-readable medium of claim 14, wherein the separate thread is prevented from advancing the global simulation time past the start time of the sliding time window.

18. The computer-readable medium of claim 14, wherein the instructions further cause the one or more processors to:

update the start time of the sliding time window by calculating the start time as a minimum of the local core time of each processor core model and the next event time.

* * * * *

UNITED STATES PATENT AND TRADEMARK OFFICE
CERTIFICATE OF CORRECTION

PATENT NO. : 10,445,445 B2
APPLICATION NO. : 15/490451
DATED : October 15, 2019
INVENTOR(S) : Dietmar Petras et al.

It is certified that error appears in the above-identified patent and that said Letters Patent is hereby corrected as shown below:

On the Title Page

Item (56), under "Other Publications", delete "Proceedings ofthe" and insert --Proceedings of the--.

In the Claims

Column 27, Claim 12, Line 18, delete "preventing the" and insert --preventing the one--.

Signed and Sealed this
Fourteenth Day of April, 2020

Andrei Iancu
*Director of the United States Patent and Trademark Office*